US012198585B2

(12) United States Patent
Tamura

(10) Patent No.: US 12,198,585 B2
(45) Date of Patent: Jan. 14, 2025

(54) DRIVE CIRCUIT OF ELECTRO-OPTICAL DEVICE, ELECTRO-OPTICAL DEVICE, AND ELECTRONIC APPARATUS

(71) Applicant: SEIKO EPSON CORPORATION, Tokyo (JP)

(72) Inventor: Tsuyoshi Tamura, Hara-mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/421,599

(22) Filed: Jan. 24, 2024

(65) Prior Publication Data

US 2024/0249654 A1 Jul. 25, 2024

(30) Foreign Application Priority Data

Jan. 25, 2023 (JP) ................................ 2023-009119

(51) Int. Cl.
*G09G 3/00* (2006.01)
*G09G 3/3225* (2016.01)

(52) U.S. Cl.
CPC ........... *G09G 3/006* (2013.01); *G09G 3/3225* (2013.01); *G09G 2300/0426* (2013.01); *G09G 2310/0291* (2013.01); *G09G 2330/12* (2013.01)

(58) Field of Classification Search
CPC .... G09G 3/006; G09G 3/3291; G09G 3/3225; G09G 3/3233; G09G 2310/0291; G09G 2330/12; G09G 2300/0426
See application file for complete search history.

(56) References Cited

U.S. PATENT DOCUMENTS

| | | | | |
|---|---|---|---|---|
| 10,304,365 | B2 * | 5/2019 | Matsui | G09G 3/36 |
| 11,658,676 | B2 * | 5/2023 | Ota | H03M 1/68 345/690 |
| 11,776,486 | B2 * | 10/2023 | Ota | G09G 3/3283 345/55 |
| 11,776,487 | B2 * | 10/2023 | Ota | G09G 3/003 345/55 |
| 11,800,762 | B2 * | 10/2023 | Ota | G09G 3/3291 |
| 11,929,036 | B2 * | 3/2024 | Ota | G09G 3/3233 |
| 2002/0163457 | A1 | 11/2002 | Azami et al. | |
| 2007/0067693 | A1 | 3/2007 | Okuzono et al. | |
| 2008/0252631 | A1 | 10/2008 | Hori | |
| 2011/0199355 | A1 | 8/2011 | Watanabe et al. | |
| 2011/0227905 | A1 | 9/2011 | Enjou | |
| 2022/0344444 | A1 * | 10/2022 | Ota | H10K 59/131 |
| 2022/0416803 | A1 * | 12/2022 | Ota | G09G 3/2092 |

FOREIGN PATENT DOCUMENTS

| | | | |
|---|---|---|---|
| JP | 2000-341125 | A | 12/2000 |
| JP | 2003-122306 | A | 4/2003 |
| JP | 2005-227505 | A | 8/2005 |
| JP | 2007-065538 | A | 3/2007 |
| JP | 2008-281992 | A | 11/2008 |
| JP | 2009-210838 | A | 9/2009 |
| JP | 2011-197203 | A | 10/2011 |
| JP | 2016-139078 | A | 8/2016 |

* cited by examiner

*Primary Examiner* — Vinh T Lam
(74) *Attorney, Agent, or Firm* — Oliff PLC

(57) ABSTRACT

In a first operation, in a tournament circuit, any one row of data lines is selected according to a selection signal, and a voltage of the selected data line is output to a test output terminal via an amplifier. In a second operation, a selection circuit in a first layer in the tournament circuit is in an off state between all the data lines and an input end of a selection circuit in a second layer.

7 Claims, 9 Drawing Sheets

DRIVE CIRCUIT OF ELECTRO-OPTICAL DEVICE, ELECTRO-OPTICAL DEVICE, AND ELECTRONIC APPARATUS

The present application is based on, and claims priority from JP Application Serial Number 2023-009119, filed Jan. 25, 2023, the disclosure of which is hereby incorporated by reference herein in its entirety.

BACKGROUND

1. Technical Field

The present disclosure relates to a drive circuit of an electro-optical device, an electro-optical device, and an electronic apparatus.

2. Related Art

For example, there has been known an electro-optical device that performs various types of display by using a light emitting element such as an OLED. OLED is an abbreviation for Organic Light Emitting Diode. In the electro-optical device, a pixel circuit including a transistor for applying a current to the light emitting element is provided corresponding to each pixel of a display image. The transistor supplies a current according to a brightness level to the light emitting element. With this, the light emitting element emits light at brightness according to the current.

In the above-mentioned electro-optical device, a voltage according to brightness is applied to a gate node of the transistor via a data line. More specifically, data designating brightness is converted into an analog voltage by a DA conversion circuit, and the converted voltage is applied to the gate node of the transistor via the data line.

As the DA conversion circuit, for example, there has been proposed a technique of providing a pair of a switch and a capacitance element that corresponds to each bit, controlling charging/discharging of an electrical charge, which is accumulated in a capacitance element, by a switch according to each bit, and outputting the electrical charge to a data line (for example, see JP-A-2000-341125).

Further, it is also common that an inspection circuit or the like for inspecting a voltage of a data line that is output to the data line is provided together with a scanning line drive circuit or a DA conversion circuit (for example, see JP-A-2005-227505).

However, the technique described in JP-A-2000-341125 has a problem in that, when a parasitic capacitance on a data line varies for each data line, a voltage to be output to the data line also differs, which causes display unevenness.

SUMMARY

In order to solve the above-mentioned problem, an electro-optical device according to an aspect of the present disclosure includes a first conversion circuit configured to convert first gradation data into an analog signal and supply the analog signal to a first data line, a second conversion circuit configured to convert second gradation data into an analog signal and supply the analog signal to a second data line, a third conversion circuit configured to convert third gradation data into an analog signal and supply the analog signal to a third data line, a fourth conversion circuit configured to convert fourth gradation data into an analog signal and supply the analog signal to a fourth data line, a tournament circuit including a first selection circuit, a second selection circuit, and a third selection circuit, and a test output terminal, wherein, in a first operation, the first selection circuit selects any one of the first data line and the second data line, and electrically couples the one to one input end of the third selection circuit, the second selection circuit selects any one of the third data line and the fourth data line, and electrically couples the one to another input end of the third selection circuit, the third selection circuit selects any one of the one input end and the other input end, and determines the one as an output of the tournament circuit when a predetermined condition is satisfied, and the test output terminal outputs a voltage based on selection of the tournament circuit, and, in a second operation, the first selection circuit electrically decouples both the first data line and the second data line from the one input end of the third selection circuit, and the second selection circuit electrically decouples both the third data line and the fourth data line from the other input end of the third selection circuit.

DESCRIPTION OF EMBODIMENTS

An electro-optical device according to exemplary embodiments are described below with reference to the accompanying drawings. Note that, in each of the drawings, dimensions and scale of each part are made different from actual ones as appropriate. Further, the exemplary embodiments described below are suitable specific examples, and various technically preferable limitations are applied, but the scope of the present disclosure is not limited to these exemplary embodiments unless they are specifically described in the following description as limiting the disclosure.

Figure 1:
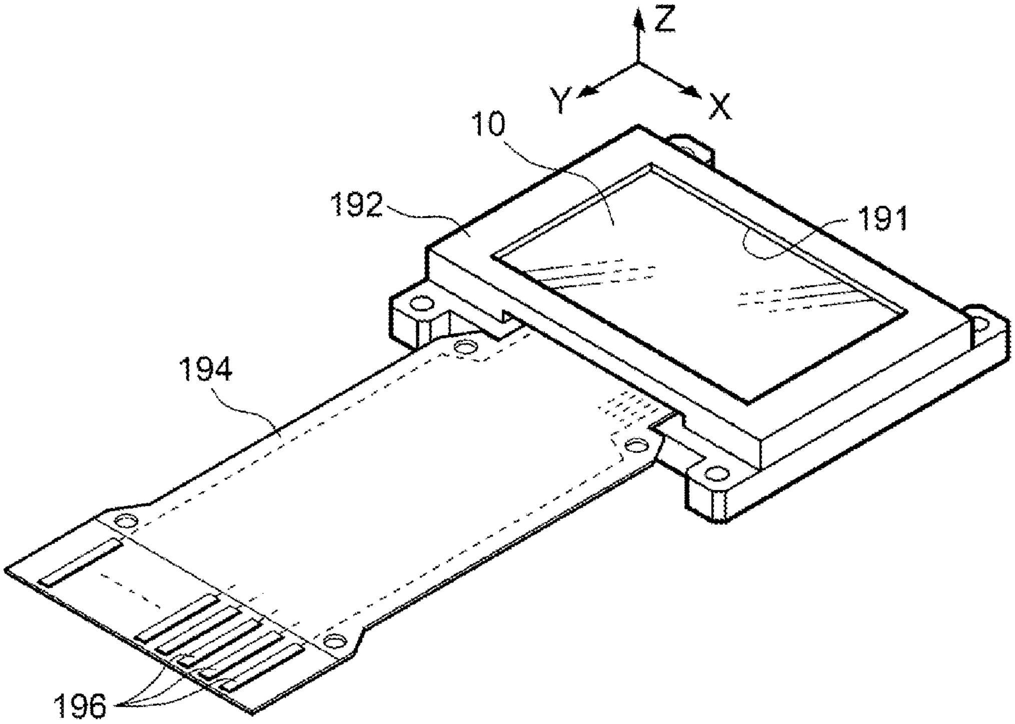
FIG. 1 is a perspective view illustrating an electro-optical device according to a first exemplary embodiment.

FIG. 1 is a perspective view illustrating an electro-optical device 10 according to an exemplary embodiment. The electro-optical device 10 is a micro display panel that displays an image, for example, in a head-mounted display or the like. The electro-optical device 10 includes a pixel circuit including a light emitting element, a drive circuit that drives the pixel circuit, an inspection circuit, and the like. The pixel circuit, the drive circuit, and the inspection circuit are integrated into a semiconductor substrate. The semiconductor substrate is typically a silicon substrate, but may be a different semiconductor substrate.

The electro-optical device 10 is accommodated in a frame-shaped case 192 that opens in a display region 100. The electro-optical device 10 is coupled to one end of an FPC substrate 194. Note that FPC is an abbreviation for "flexible printed circuit". A plurality of terminals 196 that are coupled to a host device, which is not illustrated, are provided on the other end of the FPC substrate 194. When the plurality of terminals 196 are coupled to the host device, video data, synchronization signals, and the like are supplied from the host device to the electro-optical device 10 via the FPC substrate 194.

Note that, in the drawings, an X direction is an extension direction of a scanning line in the electro-optical device 10, and a Y direction is an extension direction of a data line. A two-dimensional plane defined in the X direction and the Y direction is a substrate surface of a semiconductor substrate. A Z direction is perpendicular to the X direction and the Y direction, and is an emission direction of light emitted from a light emitting element.

Figure 2:
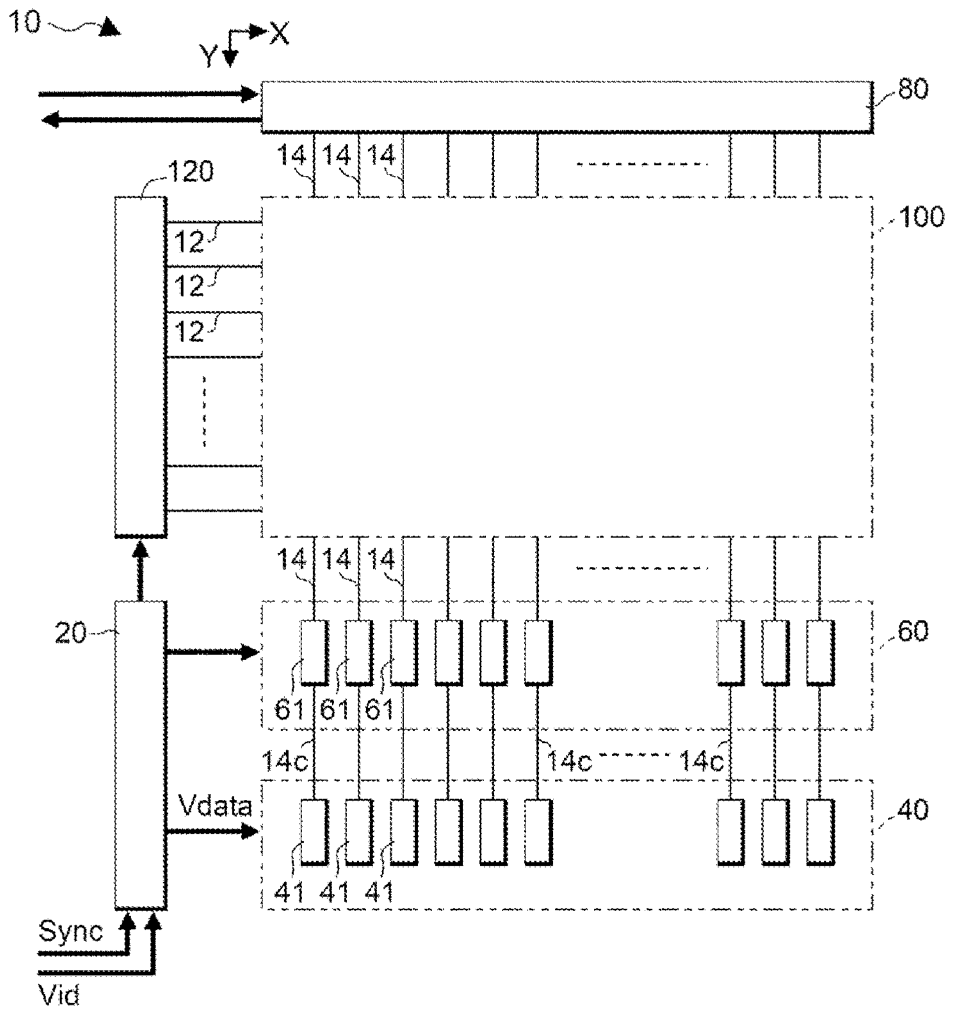
FIG. 2 is a block diagram illustrating an electrical configuration of the electro-optical device.
Figure 3:
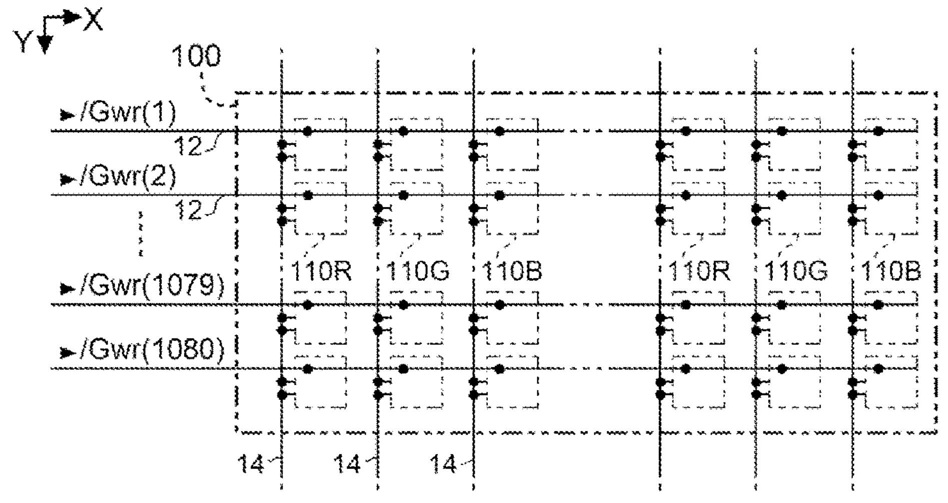
FIG. 3 is a diagram illustrating an equivalent circuit of a display region in the electro-optical device.

FIG. 2 is a block diagram illustrating an electrical configuration of the electro-optical device 10, and FIG. 3 is a diagram illustrating arrangement of pixel circuits in a display region of the electro-optical device 10.

As illustrated in FIG. 2, the electro-optical device 10 is substantially divided into a control circuit 20, a data signal output circuit 40, an initialization circuit 60, an inspection circuit 80, the display region 100, and a scanning line drive circuit 120.

In the display region 100, for example, scanning lines 12 of 1,080 rows are provided in the X direction in the drawing, and data lines 14 of 5,856 (=1,952×3) columns are provided in the Y direction to be electrically insulated from each of the scanning lines 12.

Pixel circuits 110R, 110G, and 110B are provided corresponding to the scanning line 12 arrayed in the 1,080 rows and the data line 14 arrayed in the 5,856 columns, in the following manner. In detail, the red pixel circuit 110R is provided corresponding to an intersection between the scanning line 12 in an i-th row and the data line 14 in a (3j−2)-th column. The green pixel circuit 110G is provided corresponding to an intersection between the scanning line 12 in the i-th row and the data line 14 in a (3j−1)-th column. The blue pixel circuit 110B is provided corresponding to an intersection between the scanning line 12 in the i-th row and the data line 14 in a (3j)-th column.

Note that, i is an integer from 1 to 1,080, and is used to generalize and describe the scanning lines 12. Further, j is an integer from 1 to 1,952, and is used to generalize and describe arrangement of the color pixels and the data lines 14.

The pixel circuit 110R includes a light emitting element that emits light containing a red-color component, the pixel circuit 110G includes a light emitting element that emits light containing a green-color component, and the pixel circuit 110B includes a light emitting element that emits light containing a blue-color component. Additive color mixing of the light emitted from the pixel circuits 110R, 110G, and 110B that are adjacent to each other in the same row expresses one color. Therefore, in the present exemplary embodiment, an image in which the color pixels are arrayed in a matrix of the 1,080 vertical rows×the 1,952 horizontal columns is displayed.

The pixel circuits 110R, 110G, and 110B express the red-color component, the green-color component, and the blue-color component, respectively, in one color pixel, and hence are referred to as sub pixel circuits in a strict sense. In the present description, the pixel circuits 110R, 110G, and 110B are referred to as pixel circuits for the sake of convenience.

Further, the pixel circuits 110R, 110G, and 110B have the same electrical circuit configuration. Thus, when description is made generally without specifying a color, the pixel circuit is described simply with the reference symbol 110.

The control circuit 20 controls each portion, based on video data Vid and a synchronization signal Sync that are supplied from the host device. The video data Vid designates a gradation level of each of the color pixels arrayed in the 1,080 vertical rows×the 1,952 horizontal columns for each of R, G, and B by 8 bits, for example.

The synchronization signal Sync includes a vertical synchronization signal that instructs a start of vertical scanning of the video data Vid, a horizontal synchronization signal that instructs a start of horizontal scanning, and a dot clock signal that indicates a timing of one pixel of the video data.

Characteristics of a luminance indicated by a gradation level in the video data Vid supplied from the host device and characteristics of brightness of the OLED included in the pixel circuit 110 do not necessarily match with each other. Thus, to make the OLED emit light at brightness corresponding to the gradation level designated by the video data Vid, the control circuit 20 up-converts 8 bits of the video data Vid into, for example, 10 bits and outputs it as video data Vdata, in the present exemplary embodiment. Thus, the 10-bit video data Vdata is data corresponding to the gradation level designated by the video data Vid.

In the up-conversion, there is used a look-up table in which a correspondence relationship between the 8 bits of the video data Vid being an input and the 10 bits of the video data Vdata being an output is stored in advance. Further, the control circuit 20 generates various control signals to control each portion. Details thereof are described later.

The scanning line drive circuit 120 is a circuit that outputs various types of signals and drives the pixel circuits 110 arrayed in the 1,080 rows and the 5,856 horizontal columns for each row under control by the control circuit 20. For example, the scanning line drive circuit 120 supplies scanning signals /Gwr(1), /Gwr(2), . . . , /Gwr(1079), and /Gwr(1080) to the scanning lines 12 of in the first, second, third, . . . , 1,079-th, and 1,080-th rows, respectively. To generalize, the scanning signal supplied to the scanning line 12 in the i-th row is denoted as/Gwr(i). The scanning line drive circuit 120 outputs various control signals in addition to the scanning signals /Gwr(1) to /Gwr(1080). Details thereof are described later.

The data signal output circuit 40 includes DA conversion circuits 41 provided corresponding to the data lines 14 respectively. The DA conversion circuit 41 outputs a data signal to the pixel circuit 110 located in a row selected by the scanning line drive circuit 120. Specifically, the DA conversion circuit 41 converts the 10-bit video data Vdata into an analog data signal, and outputs the analog data signal to a data signal output line 14*c*.

The initialization circuit 60 includes switch circuits 61 provided corresponding to the data lines 14 respectively. Before the data signal is output, the switch circuit 61 initializes the data line 14, the data signal output line 14*c*, the OLED, and the like.

Note that details of the DA conversion circuit 41 and the switch circuit 61 are described later.

The inspection circuit 80 is a circuit for inspecting the data signals that are output to the data line 14 in the 5,856 columns. Details of the inspection circuit 80 are described later. In the inspection operation, the inspection circuit 80 inputs a signal for specifying the data line 14 being an inspection target in the 5,856 columns. At the same time, the inspection circuit 80 outputs a voltage of the data signal applied to the data line 14 being an inspection target.

Note that, in the present exemplary embodiment, the inspection operation is not performed in the state illustrated in FIG. 1 but in the wafer state before dicing, for example. Thus, the data line 14 being an inspection target is instructed from a tester outside of the electro-optical device 10 via a test pad provided to the semiconductor substrate. Meanwhile, the voltage of the data signal applied to the data line 14 being an inspection target is output via the above-mentioned test output terminal and a probe of the tester.

Figure 4:
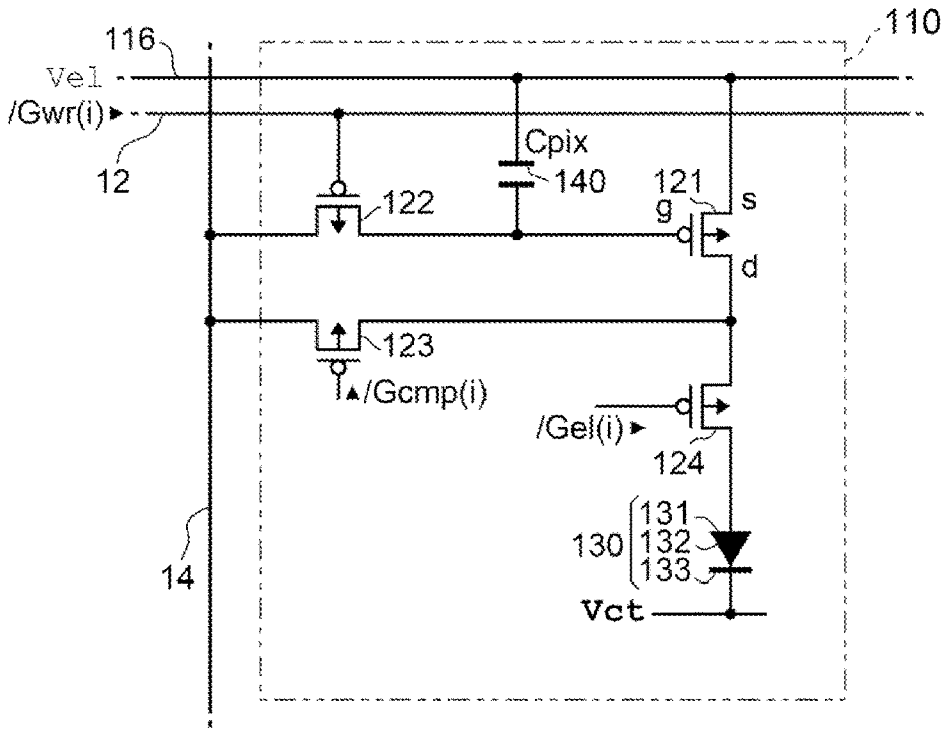
FIG. 4 is a diagram illustrating a pixel circuit of the electro-optical device.

FIG. 4 is a circuit diagram of one freely-selected pixel circuit 110 located in the i-th row. The pixel circuit 110 includes an OLED 130, p-type transistors 121 to 124, and a capacitance element 140. The transistors 121 to 124 are of a MOS type, for example. Note that MOS is an abbreviation for Metal-Oxide-Semiconductor field effect transistor. Further, in addition to the scanning signal /Gwr(i), control signals /Gel(i) and /Gcmp(i) are supplied from the scanning line drive circuit 120 to the pixel circuit 110 in the i-th row.

The control signal /Gel(i) is used to generalize and describe control signals /Gel(1), /Gel(2), . . . , /Gel(1079), and /Gel(1080) that are sequentially supplied corresponding to the first, second, . . . , 1,079-th, and 1,080-th rows. Similarly, the control signal /Gcmp(i) is used to generalize and describe control signals /Gcmp(1), /Gcmp(2), . . . , /Gcmp(1079), and /Gcmp(1080) that are sequentially supplied corresponding to the first, second, . . . , 1,079-th, and 1,080-th rows.

The OLED 130 is a light emitting element in which a light emission function layer 132 is sandwiched between a pixel electrode 131 and a common electrode 133. The pixel electrode 131 functions as an anode, and the common electrode 133 functions as a cathode. Note that the common electrode 133 has light transmissive properties. In the OLED 130, when a current flows from the anode to the cathode, holes injected from the anode and electrons injected from the cathode are recombined in the light emission function layer 132 to generate excitons, and white light is generated.

For example, the generated white light resonates in an optical resonator configured of a reflective layer and a semi-reflective and semi-transmissive layer, which is omitted in illustration, and is emitted at a resonance wavelength set corresponding to any of red (R), green (G), and blue (B). A color filter corresponding to the color is provided on the emission side of the light from the optical resonator. Thus, the emitted light from the OLED 130 is visually recognized by an observer through coloration by the optical resonator and the color filter. Note that the optical resonator and the color filter are omitted in illustration. Further, when the electro-optical device 10 simply displays a monochrome image with only brightness variations, the above-mentioned color filter may be omitted.

In the pixel circuit 110 in the i-th row, a gate node g of the transistor 121 is electrically coupled to a drain node of the transistor 122. A source node s of the transistor 121 is electrically coupled to a power supplying line 116 to which a potential Vel is supplied. A drain node d of the transistor 121 is electrically coupled to a source node of the transistor 123 and a source node of the transistor 124.

Note that, in the present description, "electrically coupled" or simply "coupled" means direct or indirect coupling or binding between two or more elements, and for example, includes a case where two or more elements are not directly bound to each other in a semiconductor substrate via a different wiring line layers and a contact hole.

In the capacitance element 140, one end thereof is electrically coupled to the gate node g of the transistor 121, and the other end thereof is electrically coupled to the power supplying line 116. Thus, the capacitance element 140 holds the voltage between the gate node g and the source node s of the transistor 121.

Note that the other end of the capacitance element 140 may be electrically coupled to a power supplying line with a different potential other than the power supplying line 116 as long as the potential is maintained substantially constant.

In the present exemplary embodiment, as the capacitance element 140, for example, a so-called MOS capacitor formed by sandwiching a gate insulating layer of the transistor between a semiconductor layer (lower electrode) and a gate node layer (upper electrode) of the transistor. Note that, as the capacitance element 140, a parasitic capacitor on the gate node g of the transistor 121 may be used, and a so-called metal capacitor formed by sandwiching an insulating layer between mutually different conductive layers in a semiconductor substrate may be used.

In the pixel circuit 110 in the i-th row, a gate node of the transistor 122 is electrically coupled to the scanning line 12 in the i-th row, and a source node of the transistor 122 is electrically coupled to the data line 14 corresponding to the pixel circuit 110.

In the pixel circuit 110 in the i-th row, the control signal /Gcmp(i) is supplied to a gate node of the transistor 123, and a drain node of the transistor 123 is electrically coupled to the data line 14 corresponding to the pixel circuit 110.

In the pixel circuit 110 in the i-th row, the control signal /Gel(i) is supplied to a gate node of the transistor 124, and a drain node of the transistor 124 is electrically couple to the pixel electrode 131 being an anode of the OLED 130.

Note that, in the transistors 122, 123, and 124, when the direction in which the current flows is inverted, the source node and the drain node are switched. In the present description, the source node and the drain node are as described above.

Figure 5:
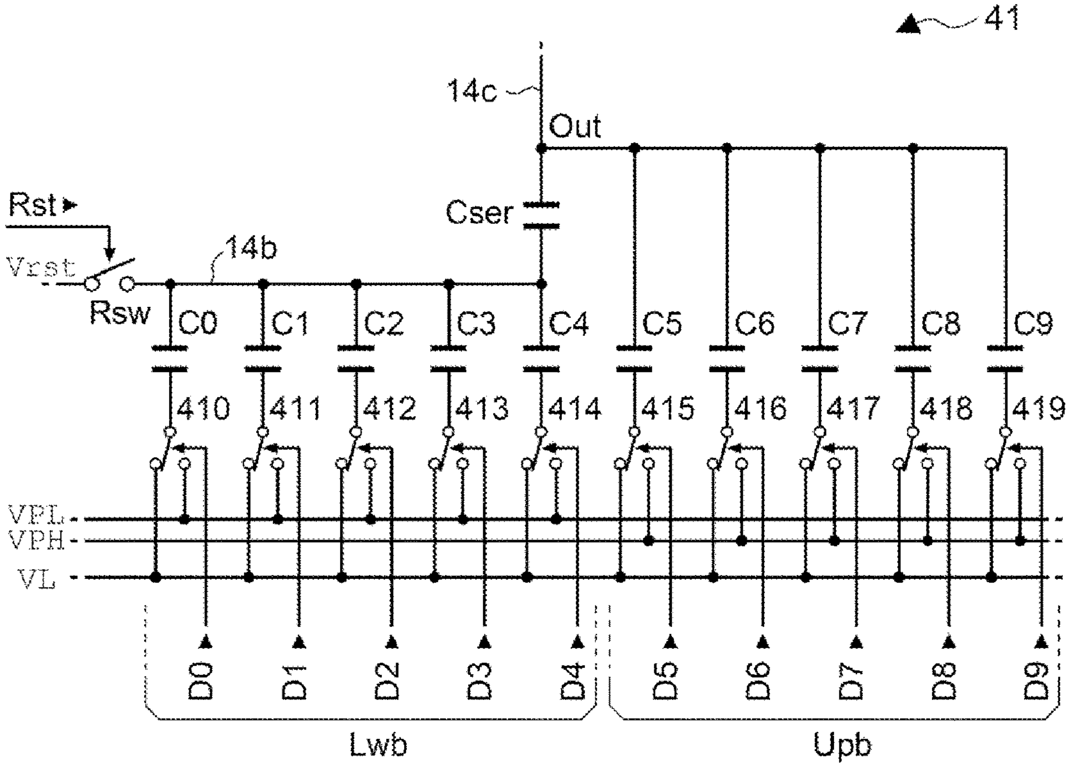
FIG. 5 is a diagram illustrating an equivalent circuit of a DA conversion circuit in the electro-optical device.

FIG. 5 is a diagram illustrating the DA conversion circuit 41 in a freely selected one column in the data signal output circuit 40.

The 10 bits of the video data Vdata corresponding to the pixel circuit 110 are supplied to the DA conversion circuit 41 during an output period (writing period), which is described later. Here, the pixel circuit 110 is located at an intersection between the selected scanning line 12 and the data line 14 in the column corresponding to the DA conversion circuit 41. Specifically, for example, during a writing period in a horizontal scanning period in the i-th row, the 10 bits of the video data Vdata being R components are supplied to the DA conversion circuit 41 in the (3j−2)-th column, among the color pixels n the i-th row and the (3j)-th column.

For the sake of convenience, of the 10 bits of the video data Vdata that are supplied during the output period, the least significant bit is denoted with D0, and the second significant to the most significant bits are denoted with D1 to D9, respectively. During the period other than the output period, the bits D0 to D9 are at an L level.

Note that, in the present description, the L level is a potential Gnd and an H level is the potential Vel, for example.

The control signal Rst is supplied from the control circuit 20 to the DA conversion circuit 41, and potentials Vrst, VL, VPL, and VPH are supplied from a power source circuit, which is omitted in illustration. The control signal Rst is common in the DA conversion circuits 41 in the respective columns, and the potentials Vrst, VL, VPL, and VPH are also common in the DA conversion circuits 41 in the respective columns.

Note that, although the potentials VPL and VPH are given separately, description is made assuming that VPL=VPH in the exemplary embodiment for the sake of convenience. Further, the potentials VL, VPL, and VPH establish a relationship of VL<VPL=VPH.

The DA conversion circuit 41 includes capacitance elements C0 to C9 and Cser, a switch Rsw, and selection circuits 410 to 419. The capacitance elements C0 to C9 and the selection circuits 410 to 419 form pairs in the following manner so as to correspond to the respective bits. In detail, the selection circuit 410 and the capacitance element C0 form a pair corresponding to the bit D0, and the selection circuit 411 and the capacitance element C1 form a pair corresponding to the bit D1. Similarly to the above, the selection circuit 419 and the capacitance element C9 form a pair corresponding to the bit D9.

Each of the selection circuits 410 to 414 that correspond to the less significant bits is a single pole double throw switch that selects the potential VL when the corresponding bit is at the L level corresponding to "0", and selects the potential VPL when the corresponding bit is at the H level corresponding to "1", and supplies the selected potential to one end of the corresponding capacitance element.

Each of the selection circuits 415 to 419 that correspond to the more significant bits is a single pole double throw switch that selects the potential VL when the corresponding bit is at the L level corresponding to "0", and selects the potential VPH when the corresponding bit is at the H level corresponding to "1", and supplies the selected potential to one end of the corresponding capacitance element.

For example, the selection circuit 410 corresponding to the bit D0 selects the potential VPL when the bit D0 is "1" (at the H level), selects the potential VL when the bit D0 is "0" (at the L level), and supplies the selected potential to one end of the capacitance element C0. Further, for example, the selection circuit 416 corresponding to the bit D6 selects the potential VPH when the bit D6 is "1" (at the H level), selects the potential VL when the bit D6 is "0" (at the L level), and supplies the selected potential to one end of the capacitance element C6.

Capacitance values of the capacitance elements C0 to C9 are set to the following ratios in the present exemplary embodiment. In detail, when the capacitance value of the capacitance element C0 is "1", the capacitance values of the capacitance elements C2, C3, C4, C5, C6, C7, C8, and C9 are "2", "4", "8", "16", "1", "2", "4", "8", and "16" in the stated order.

Note that the weights of the bits D0 to D9 are "1", "2", "4", "8", "16", "32", "64", "128", "256", and "512", respectively, in consideration of the 10 bits as a whole. Thus, the capacitance values of the capacitance elements C0 to C9 are not weighted. However, when the bits D0 to D9 are divided into a group including the bits D0 to D4 being less significant and a group including the bits D5 to D9 being more significant, the bit D5 is the least significant bit of the bits D5 to D9, and the weight thereof is regarded as "1". With this, the weights of the bits D5 to D9 are "1", "2", "4", "8", and "16", respectively.

Further, the capacitance value of the capacitance element Cser is "1" in the exemplary embodiment. Note that the capacitance values of the capacitance elements C0 to C9 and Cser can tolerate a certain degree of error as long as the linearity of the output voltage, which is described later, is maintained. In the exemplary embodiment, a MOS capacitor is used as the capacitance element 140 in the pixel circuit 110. Thus, a MOS capacitor may also be used as the capacitance elements C0 to C9 and Cser. Note that a metal capacitor may also be used as the capacitance elements C0 to C9 and Cser.

Of the capacitance elements C0 to C9, the other ends of the capacitance elements C0 to C4 corresponding to the five bits being less significant are electrically coupled to one end of the capacitance element Cser. For the sake of convenience, a coupling line between the other ends of the capacitance elements C0 to C4 and the one end of the capacitance element Cser is regarded as a relay line 14*b*.

Further, of the capacitance elements C0 to C9, the other ends of the capacitance elements C5 to C9 corresponding to the five bits being more significant are electrically coupled to the data signal output line 14*c* being an output end of the DA conversion circuit 41 and the other end of the capacitance element Cser.

The switch Rsw is in an on state or an off state according to the control signal Rst between the power supplying line at the potential Vrst and the relay line 14*b*. In detail, when the control signal Rst is at the H level, the switch Rsw is in the on state. When the control signal Rst is at the L level, the switch Rsw is in the off state.

In the present description, the "on state" of the switch, the transistor, or the transmission gate means that a distance between both the ends of the switch, the source node and the drain node in the transistor, or the both the ends of the transmission gate is electrically closed to be in a low impedance state. Further, the "off state" of the switch, the transistor, or the transmission gate means that a distance between both the ends of the switch, the source node and the drain node in the transistor, or the both the ends of the transmission gate is electrically opened to be in a high impedance state.

Note that, in FIG. 5, description is made on the DA conversion circuit 41 in a freely selected column. The DA conversion circuits 41 corresponding to the other columns have similar configurations. FIG. 5 merely illustrates an electrical configuration, and does not illustrate actual locations or arrangement of the elements of the DA conversion circuit 41. Further, when the DA conversion circuit 41 corresponding to a specific data line 14 is described, the description may be made by using the integer j similarly to the data line 14.

An operation of the DA conversion circuit 41 is divided into a reset period and an output period. Note that the reset period of the DA conversion circuit 41 corresponds to an initialization period (A1) and a compensation period (B) in an operation period of the electro-optical device 10, which is described later, and the output period of the DA conversion circuit 41 corresponds to a writing period (C) in the operation period of the electro-optical device 10.

In the DA conversion circuit 41, the switch Rsw is in the on state during the reset period. During the period other than the writing period, the bits D0 to D9 are "0", and hence the selection circuits 410 to 419 select the potential VL. Further, as described later, during the reset period, the data signal output line 14*c* being an output end is at a potential Vini. Thus, electrical charges according to the capacitance values are accumulated in the capacitance elements C0 to C9.

In the DA conversion circuit 41, during the output period, the selection circuits 410 to 414 select the potential VL when the corresponding bit is "0", and select the potential VPL when the corresponding bit is "1". Further, during the output period, the selection circuits 415 to 419 select the potential VL when the corresponding bit is "0", and select the potential VPH when the corresponding bit is "1". Thus, at the terminal stage of the output period, the selection circuits 410 to 419 sequentially select the potential VL or VPL/VPH according to the bits D0 to D9.

In other words, during the output period, the voltages at the one ends of the capacitance elements C0 to C9 are changed (increased) or maintained according to the bits D0 to D9. Thus, of the capacitance elements C0 to C9, at the other ends of the capacitance elements C0 to C9 having the one ends at which the voltages are changed, the accumulated electrical charges are discharged, and the voltages are increased from the voltages at the terminal stage of the reset period by voltages according to the capacitance values.

At the other ends of the capacitance elements C5 to C9 corresponding to the more significant bits, the voltage of the data signal output line 14*c* is increased according to the capacitance value. In contrast, the other ends of the capacitance elements C0 to C4 corresponding to the less significant bits are coupled to the data signal output line 14*c* via the capacitance element Cser. Thus, the voltage change in the relay line 14*b* being the other ends of the capacitance elements C0 to C4 is compressed with a ration determined by the capacitance elements C0 to C4 and Cser. With this, the voltage of the data signal output line 14*c* is changed. The ratio is denoted with a compression ratio k. The compression ratio k is expressed in Expression (1) given below.

$$k=Cser/(Cser+C0+C1+C2+C3+C4) \quad (1)$$

Note that, in the exemplary embodiment, the compression ratio k is 1/32=1/(1+1+2+4+8+16)).

Here, in FIG. 5, a circuit including the capacitance elements C5 to C9 and selection circuits 515 to 519 is referred to as an upper conversion circuit Upb. The upper conversion circuit Upb outputs the voltages corresponding to the bits D5 to D9 to the data signal output line 14*c*.

Similarly, a circuit including the capacitance elements C0 to C4 and selection circuits 510 to 514 is referred to as a lower conversion circuit Lwb. The lower conversion circuit Lwb outputs the voltage corresponding to the bits D0 to D4 to the relay line 14*b*. However, the voltage change of the relay line 14*b* is compressed to 1/32 being the compression ratio k, and is output to the data signal output line 14*c*.

Thus, even when the bits D0 to D4 are in the same order as the bits D5 to D9, the voltage change of the data signal output line 14*c* due to the lower conversion circuit Lwb is 1/32 of the voltage change of the data signal output line 14*c* due to the upper conversion circuit Upb.

Therefore, the DA conversion circuit 41 changes the data signal output line 14*c* from the voltage at the terminal stage of the reset period (the potential Vini) by a voltage according to the weights of the bits D0 to D9 during the output period.

Figure 6:
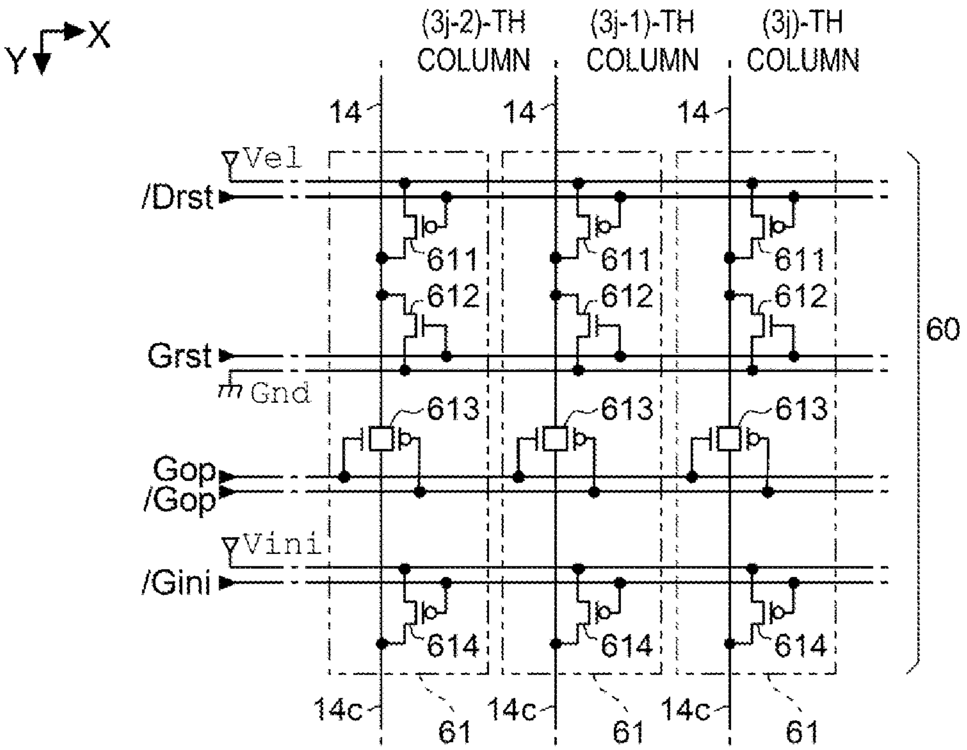
FIG. 6 is a diagram illustrating an initialization circuit of the electro-optical device.

FIG. 6 is a diagram illustrating the switch circuits 61 in the three columns in the initialization circuit 60. Note that the three columns are the (3j−2)-th column, the (3j−1)-th column, and the (3j)-th column.

The switch circuit 61 in each column is an integrated body including p-type transistors 611 and 614, an n-type transistor 612, and a transmission gate 613. The transistors 611, 612, and 614 and a transistor configuring the transmission gate 613 are of a MOS type, which is similar to the transistors 121 to 124 of the pixel circuit 110.

For example, while focusing on the (3j−2)-th column, a control signal /Drst is supplied to a gate node of the transistor 611 in the switch circuit 61 in the column. The control signal /Drst is supplied commonly to each column from the control circuit 20. A source node of the transistor 611 is electrically coupled to the power supplying line at the potential Vel, and a drain node of the transistor 611 is electrically coupled to the data line 14 in the (3j−2)-th column.

A control signal Grst is supplied to a gate node of the transistor 612 in the switch circuit 61 in the (3j−2)-th column. The control signal Grst is supplied commonly to each column from the control circuit 20. A source node of the transistor 612 is grounded at the potential Gnd being a reference of a voltage of zero, and a drain node of the transistor 612 is electrically coupled to the data line 14 in the (3j−2)-th column.

The transmission gate 613 in the switch circuit 61 in the (3j−2)-th column is provided between the data signal output line 14*c* in the (3j−2)-th column and the data line 14 in the (3j−2)-th column, and is in the on state or the off state according to control signals Gop and /Gop. The control signals Gop and /Gop have logical levels that are mutually exclusive, and are supplied commonly to each column from the control circuit 20. When the control signal Gop is at the H level, and the control signal /Gop is at the L level, the transmission gate 613 is in the on state. When the control signal Gop is at the L level, and the control signal /Gop is at the H level, the transmission gate 613 is in the off state.

A control signal /Gini is supplied to a gate node of the transistor 614 in the switch circuit 61 in the (3j−2)-th column. The control signal /Gini is supplied commonly to each column from the control circuit 20. A source node of the transistor 614 is electrically coupled to the power supplying line at the potential Vini, and a drain node of the transistor 614 is electrically coupled to the data signal output line 14*c* in the (3j−2)-th column.

Note that the potential Vini is set to be less than the potential of the gate node g (Vel−Vth) when, in the pixel circuit 110, the voltage between the gate node g and the source node s of the transistor 121 is a threshold voltage Vth of the transistor 121.

Figure 7:
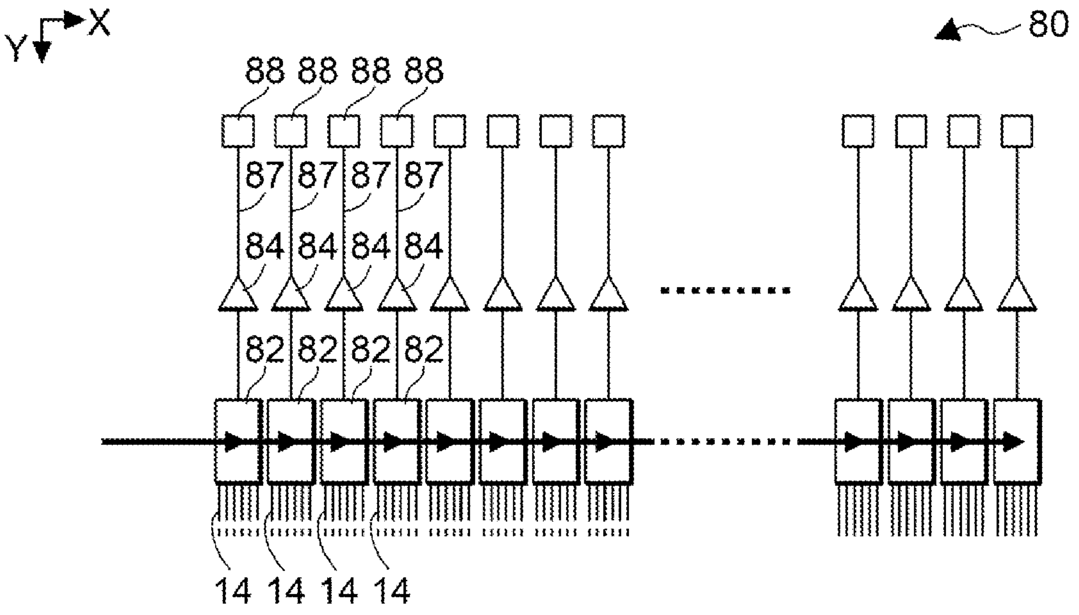
FIG. 7 is a diagram illustrating an inspection circuit of the electro-optical device.

FIG. 7 is a diagram illustrating the inspection circuit 80.

In the present exemplary embodiment, the data lines 14 in the 5,856 columns are formed into groups each including 122 columns. Each of the groups is correspondingly provided with one group including a tournament circuit 82, an amplifier 84, and a test output terminal 88.

One tournament circuit 82 selects the data line 14 in any one column from the data lines 14 in the 122 columns according to the selection signal. Note that a circuit configuration that supplies the selection signal is omitted in illustration.

The amplifier 84 amplifies a signal of the data line 14 selected by the tournament circuit 82. The output impedance of the data line 14 is high, and hence the voltage of the data line 14 significantly fluctuates even when a slight load is coupled thereto. Thus, the signal that is output from the data line 14 is subjected to current amplification the amplifier 84 while the voltage gain is set to "1", in other words, the output impedance of the data line 14 is converted into a low impedance. Then, the signal is output. The signal after current amplification by the amplifier 84 is output to the test output terminal 88. 48 (=5856÷122) groups each including the tournament circuit 82, the amplifier 84, and the test output terminal 88, which are described above, are provided.

Note that the 48 groups each including the tournament circuit 82, the amplifier 84, and the test output terminal 88 are arrayed in the X direction. Thus, when the tournament circuit 82, the amplifier 84, or the test output terminal 88 in a specific group is described, description is made with the number from the left.

Figure 8:
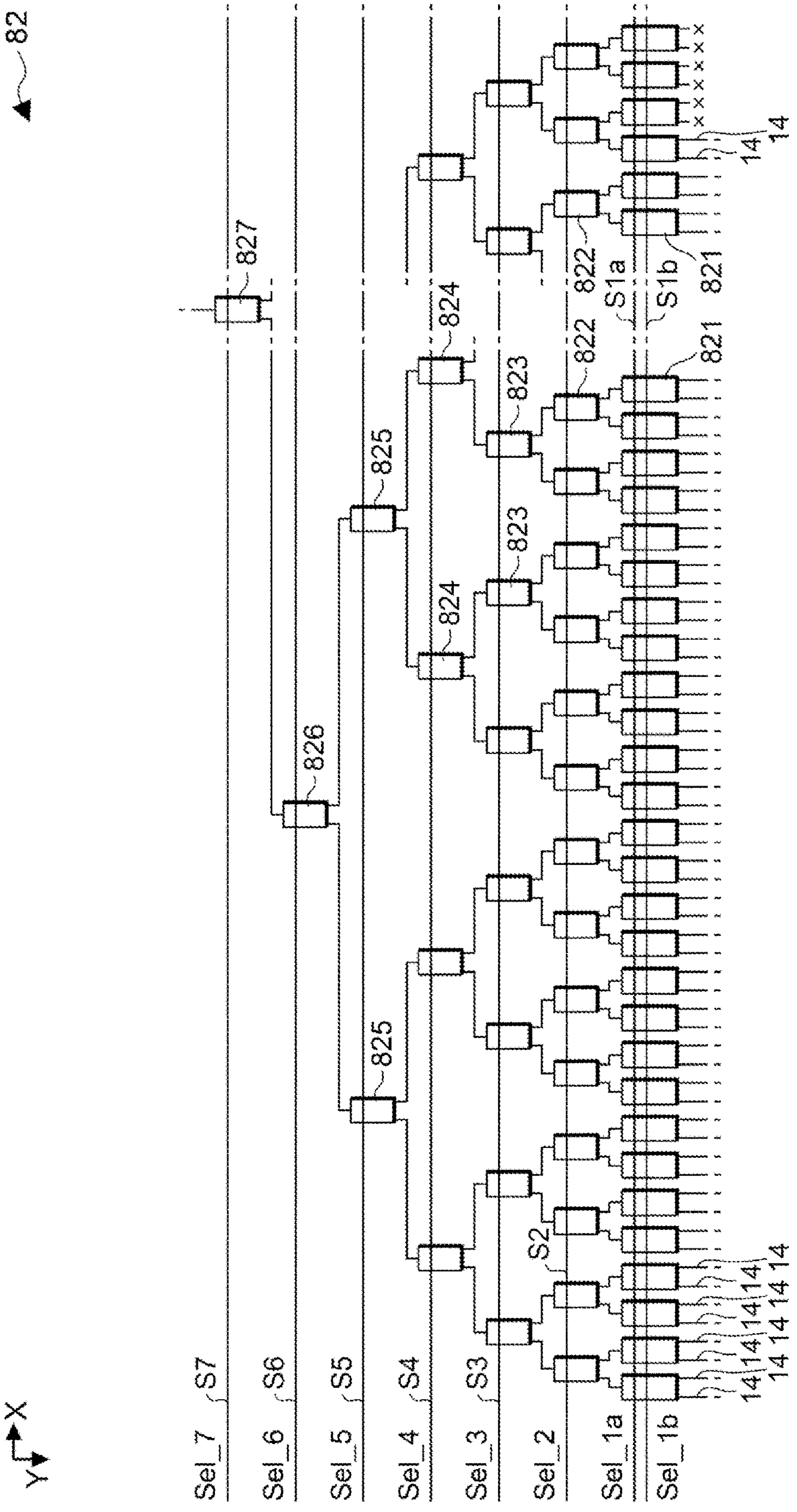
FIG. 8 is a diagram illustrating a tournament circuit in the inspection circuit.

FIG. 8 is a diagram illustrating one tournament circuit 82 in the inspection circuit 80. The tournament circuit 82 includes selection circuits 821 to 827 that select the data line 14 in a tournament. Note that selection in a tournament indicates that one of the two inputs is sequentially selected in a hierarchical manner and one input is finally selected.

In the present exemplary embodiment, in the tournament circuit 82, an either-or approach is performed seven times in a hierarchical manner. In other words, selection in the first layer is performed by 64 selection circuits 821, selection in the second layer is performed by 32 selection circuits 822, and selection in the third layer is performed by 16 selection circuits 823. Similarly, selection in the seventh layer is performed by one selection circuit 827. In other words, each of the selection circuits 821 to 827 includes two input ends. Of those, an output end of each of the selection circuits 821 to 826 is electrically coupled to any one of the two input ends of the selection circuit in the layer above. An output end of the selection circuit 827 is electrically coupled to an input end of the amplifier 84.

Each of the 64 selection circuits 821 selects any one of the input ends or selects neither of the input ends, according to logical levels of a selection signal Sel_1*a* supplied via a wiring line S1*a* and a selection signal Sel_1*b* supplied via a wiring line S1*b*.

The data line 14 in the odd-numbered column of the data lines 14 in the two adjacent columns is electrically coupled to one input end of each of 61 selection circuits 821 of the 64 selection circuits 821, and the data line 14 in the even-numbered column is electrically coupled to the other input end thereof. As indicated with the mark x in the drawing, the data lines 14 are not coupled to the input ends of the other three selection circuits 821 of the 64 selection circuits.

Each of the 32 selection circuits 822 selects any one of the input ends according to a logical level of a selection signal Sel_2 supplied via a wiring line S2. Similarly to the above, each of the 16 selection circuits 823 selects any one of the input ends according to a logical level of a selection signal Sel_3 supplied via a wiring line S3, each of the eight selection circuits 824 selects any one of the input ends according to a logical level of a selection signal Sel_4 supplied via a wiring line S4, each of the four selection circuits 825 selects any one of the input ends according to a logical level of a selection signal Sel_5 supplied via a wiring line S5, each of the two selection circuits 826 selects any one of the input ends according to a logical level of a selection signal Sel_6 supplied via a wiring line S6, and the one selection circuit 827 selects any one of the input ends according to a logical level of a selection signal Sel_7 supplied via a wiring line S7.

Note that the selection signals Sel_1*a*, Sel_1*b*, and Sel_2 to Sel_7 are supplied to the one tournament circuit 82 being focused on, but also supplied commonly to the other 47 tournament circuits 82.

Figure 9:
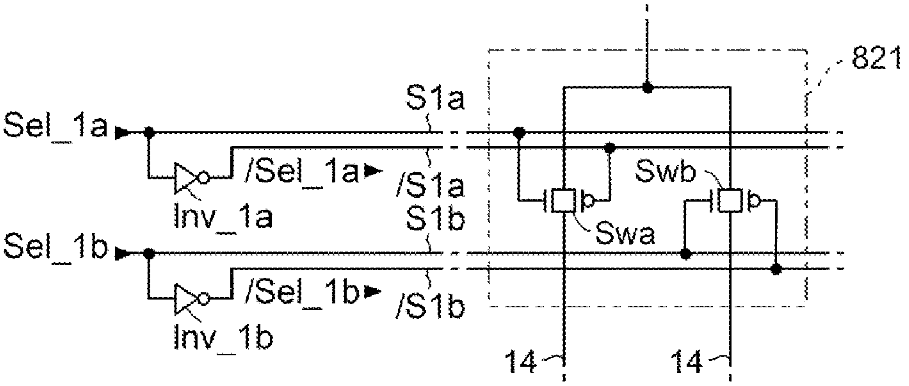
FIG. 9 is a diagram illustrating an initial stage selection circuit in the tournament circuit.

Further, in FIG. 8, only the selection signals Sel_1*a* and Sel_1*b* are supplied to the selection circuit 821. In actuality, as illustrated in FIG. 9 described next, a selection signal /Sel_1*a* obtained by inverting the logical level of the selection signal Sel_1*a* and a selection signal /Sel_1*b* obtained by inverting the logical level of the selection signal Sel_1*b* are supplied thereto. Similarly, selection signals /Sel_2 to /Sel_7 are also supplied to the selection circuits 822 to 827, respectively. The selection signals /Sel_2 to /Sel_7 are signals obtained by inverting the logical levels of the selection signals Sel_2 and Sel_7.

Further, in one tournament circuit 82, the 64 selection circuits 821 are arrayed in the X direction. Thus, when a specific selection circuit 821 is described, description is made with the number from the left.

Similarly, the selection circuits 822 to 826 are arrayed in the X direction in the respective layers. Thus, similarly, specific selection circuits 822 to 826 are described, description is made with the number from the left.

FIG. 9 is a diagram illustrating a configuration of one freely-selected selection circuit 821 coupled to the data line 14 among the 64 selection circuits 821 in the first layer.

The selection signals Sel_1*a*, /Sel_1*a*, Sel_1*b*, and /Sel_1*b* are supplied sequentially to the selection circuit 821 via the wiring lines S1*a*, /S1*a*, S1*b*, and /S1*b*. The selection signal /Sel_1*a* is a signal obtained by inverting the logical level of the selection signal Sel_1*a* by a NOT circuit Inv_1*a*, and the selection signal /Sel_1*b* is a signal obtained by inverting the logical level of the selection signal Sel_1*b* by a NOT circuit Inv_1*b*.

The selection circuit 821 includes transmission gates Swa and Swb. An input end of the transmission gate Swa is electrically coupled to the data line 14 in the odd-numbered column of the data lines 14 in the two adjacent columns, and an input end of the transmission gate Swb is electrically coupled to the data line 14 in the even-numbered column of the two columns.

An output end of the transmission gate Swa and an output end of the transmission gate Swb are coupled to each other in a commonly shared manner, and the coupled end is electrically coupled to any one of two input ends of the selection circuit 822 in the second layer.

Note that, of the 64 selection circuits 821, the three selection circuits 821 that are not coupled to the data line 14 are also configured similarly to the other the selection circuits 821, except that the input end of the transmission gate Swa and the input end of the transmission gate Swb are not coupled to the data line 14.

Figure 10:
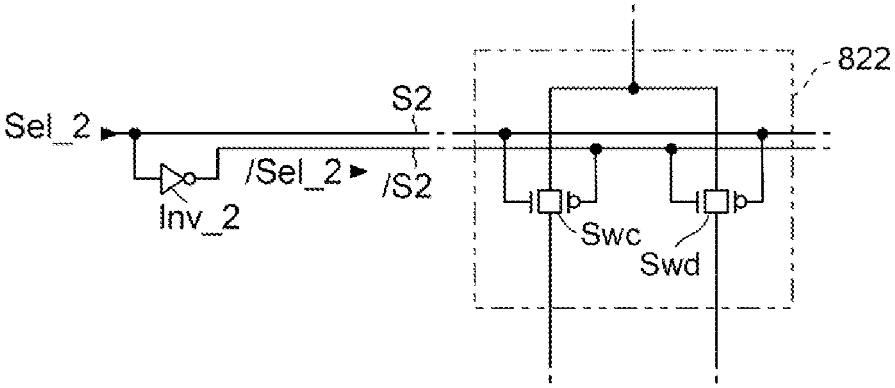
FIG. 10 is a diagram illustrating a non-initial stage selection circuit in the tournament circuit.

FIG. 10 is a diagram illustrating a configuration of one freely-selected selection circuit 822 of the 32 selection circuits 822 in the second layer.

The selection signals Sel_2 and /Sel_2 are sequentially supplied to the selection circuit 822 via the wiring lines S2 and /S2. The selection signal /Sel_2 is a signal obtained by inverting the logical level of the selection signal Se2 by the NOT circuit Inv_1*a*.

The selection circuit 822 includes transmission gates Swc and Swd. An input end of the transmission gate Swc is electrically coupled to an output end of the selection circuit 821 in the odd-numbered column of the two adjacent columns, and an input end of the transmission gate Swd is electrically coupled to an output end of the selection circuit 821 in the even-numbered column of the two columns.

An output end of the transmission gate Swc and an output end of the transmission gate Swd are coupled to each other in a commonly shared manner, and the coupled end is electrically coupled to any one of two input ends of the selection circuit 823 in the third layer.

The 16 selection circuits 823 in the third layer, the eight selection circuits 824 in the fourth layer, the four selection circuits 825 in the fifth layer, the two selection circuits 826 in the sixth layer, and the one selection circuit 827 in the seventh layer are configured similarly to the selection circuit 822, except that the selection signals are different.

Note that, with the configuration omitted in illustration, the wiring line S1*a* and the wiring line S1*b* are fixed at the L level and a wiring lines /S1*a* and a wiring line /S1*b* are fixed at the H level in the inspection operation, except for a case in which the tester is coupled to inspect the data signal output to the data line 14. Further, except for a case in which the data signal output to the data line 14 is inspected, the wiring lines S2 to S7 are fixed at the L level or the H level.

The operation of the electro-optical device 10 is divided into the inspection operation for inspecting the voltage output to the data line 14 in the 5,856 columns and the display operation for displaying a video designated in video data Vin. For the sake of convenience in description, the inspection operation is described first.

In the inspection operation of the electro-optical device 10, the selection signals Sel_1*a*, Sel1*b*, Sel_2 to Sel_7 are supplied under an instruction from the tester. Further, a probe contacts with each of the 48 test output terminals 88, and the voltage output from the test output terminal 88 via the probe is measured by the tester.

In the inspection operation, the control circuit 20 causes the DA conversion circuit 41 in each column to perform the operation of the reset period and then perform the operation of the output period. Specifically, the control circuit 20 sets the control signal Rst to be at the H level, the switch Rsw to be in in the on state, the control signal Gop to be at the L level (the control signal /Gop to be at the H level), and the transmission gate 613 to be in the off state. At the same time, the control circuit 20 sets all the bits D0 to D9 to be "0", and causes the selection circuits 410 to 419 to select the potential VL (the reset period).

After that, the control circuit 20 sets the control signal Rst to be at the L level, the switch Rsw to be in the off state, the control signal Gop to be at the H level (the control signal /Gop to be at the L level), and the transmission gate 613 to be in the on state. At the same time, the control circuit 20 supplies predetermined values as the bits D0 to D9 (for example, all the values are "1") (the output period).

With this, respective voltages according to predetermined values indicated with the bits D0 to D9 are output to the data lines 14 in the 5,856 columns.

Meanwhile, the tester instructs the data line 14 in one column of the 122 columns to be an inspection target. The selection signals Sel_1*a*, Sel1*b*, and Sel2 to Sel_7 for selecting the data line 14 in one column being instructed are generated, and the selection signals Sel_1*a*, Sel1*b*, and Sel2 to Sel_7 select the data line 14 in one column.

The voltage of the selected data line 14 is amplified by the amplifier 84, and is output from the test output terminal 88. Thus, the tester checks whether the voltage output from the selected data line 14 falls within a range of the voltage corresponding to the predetermined value.

The tester performs such checking for the voltages output from the 48 output terminals 88 while sequentially instructing the data lines 14 in the 122 columns. With this, the voltages output from the data lines 14 in the 5,856 columns are checked.

Next, a display operation of the electro-optical device 10 is described.

Figure 11:
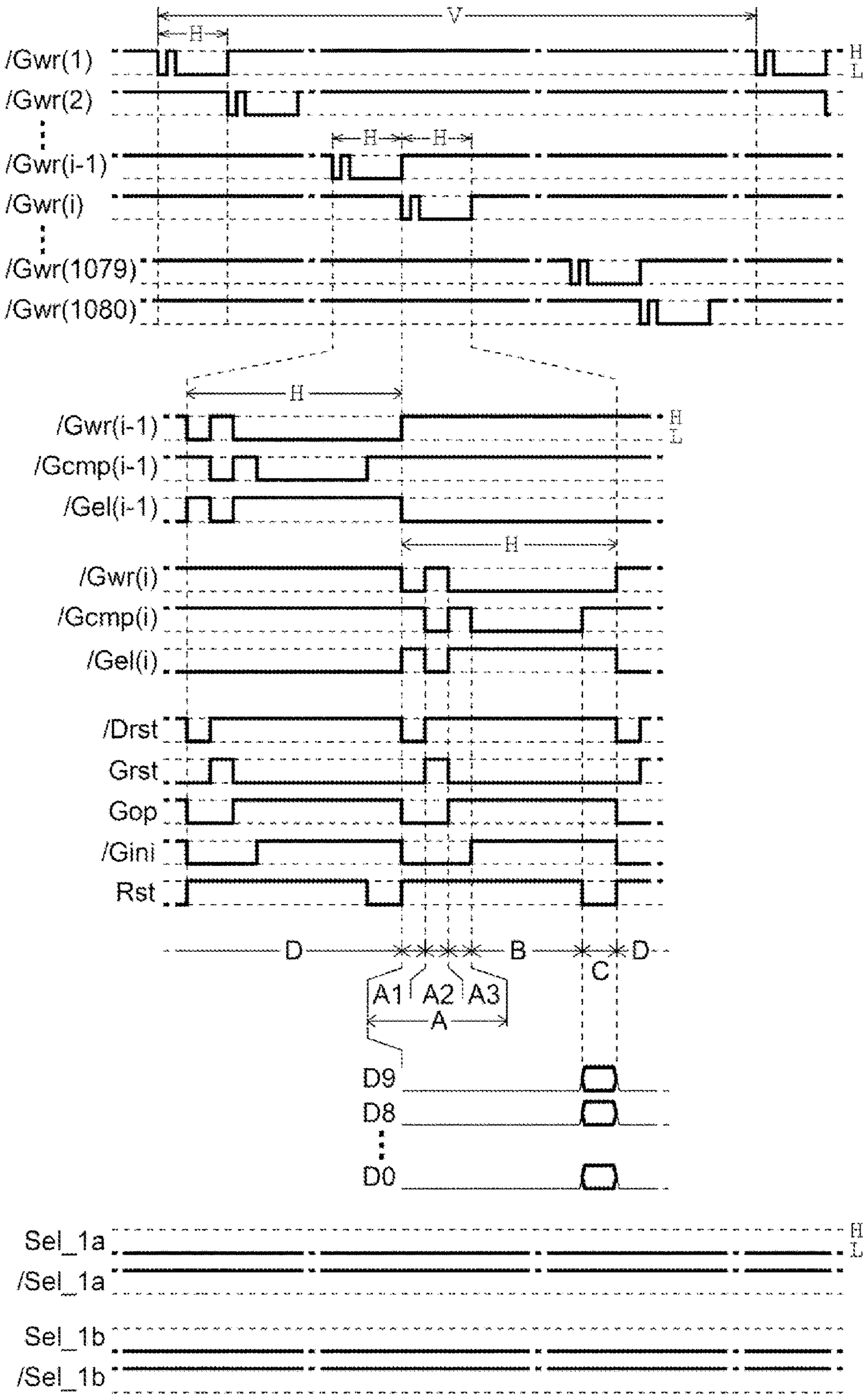
FIG. 11 is a timing chart illustrating a display operation of the electro-optical device.

FIG. 11 is a timing chart for describing the display operation.

In the display operation, because the tester is not coupled, a wiring line S1_*a* and a wiring line S1_*b* are always at the L level, and a wiring line /S1_*a* and a wiring line /S1_*b* are always at the H level.

In the electro-optical device 10, in the display operation, the 1,080 scanning lines 12 are scanned one by one in the order of the first, second, . . . , 1,079-th, and 1,080-th rows during a period of one frame (V).

In the present description, the period of one frame (V) refers to a period required to display one frame of an image designated by the video data Vid. In a case in which a length of the period of one frame (V) is the same as a vertical synchronization period, for example, when a frequency of a vertical synchronization signal included in the synchronization signal Sync is 60 Hz, it is 16.7 milliseconds which corresponds to one cycle of the vertical synchronization signal. Further, a horizontal scanning period (H) is a time interval during which the scanning lines 12 in the first to 1,080-th columns are sequentially scanned.

In the display operation of the electro-optical device 10, one horizontal scanning period (H) is divided mainly into three periods including an initialization period (A), a compensation period (B), and the writing period (C). The initialization period (A) are divided into three initialization periods (A1), (A2), and (A3). Further, as an operation of the pixel circuit 110, a light emitting period (D) is further added in addition to the above-mentioned three periods.

Operations in the horizontal scanning period (H) are described. Further, for description of the pixel circuit 110, the pixel circuit 110 in a freely selected column in the i-th row is given as an example.

During the initialization period (A1) in the i-th row, the scanning signal /Gwr(i) is at the L level, the control signal /Gcmp(i) is at the H level, and the control signal /Gel(i) is at the H level. Thus, in the pixel circuit 110 in the i-th row, the transistor 122 is in the on state, the transistor 123 is in the off state, and the transistor 124 is in the off state.

Further, during the initialization period (A1), the control signal /Drst is at the L level, the control signal Grst is at the L level, the control signal Gop is at the L level (the control signal /Gop is at the H level), and the control signal /Gini is at the L level. Thus, during the initialization period (A1), the transistor 611 is in the on state, the transistor 612 is in the off state, the transmission gate 613 is in the off state, and the transistor 614 is in the on state.

Therefore, the data signal output line 14*c* is at the potential Vini, and the data line 14 is at the potential Vel. In the pixel circuit 110 in the i-th row, the transistor 122 is in the on state. Thus, the gate node g of the transistor 121 in the pixel circuit is at the potential Vel, and the source node and the drain node of the transistor 121 are forced to be in the off state.

Note that, in the DA conversion circuit 41, during the initialization period (A1), the control signal Grst is at the H level. Thus, the switch Rsw is in the on state. Because the transistor 614 is in the on state, the data signal output line 14*c* is at the potential Vini. Because the bits D0 to D9 are "0", each of the selection circuits 410 to 419 selects the potential VL. With this, electrical charges according to the capacitance values are accumulated in the capacitance elements C0 to C9.

During the initialization period (A2) in the i-th row, the scanning signal /Gwr(i) is changed to the H level, the control signal /Gcmp(i) is changed to the L level, and the control signal /Gel(i) is changed to the L level. Thus, in the pixel circuit 110 in the i-th row, the transistor 122 is changed to be in the off state, the transistor 123 is changed to be in the on state, and the transistor 124 is changed to be in the on state.

Further, during the initialization period (A2), the control signal /Drst is changed to the H level, the control signal Grst is changed to the H level, the control signal Gop is maintained at the L level (the control signal /Gop is at the H level), and the control signal /Gini is maintained at the L level. Thus, during the initialization period (A2), the transistor 611 is changed to be in the off state, the transistor 612 is changed to be in the on state, the transmission gate 613 is maintained to be in the off state, and the transistor 614 is maintained to be in the on state.

Therefore, the data signal output line 14*c* maintains the potential Vini, and the data line 14 is at the potential Gnd. In the pixel circuit 110 in the i-th row, the transistors 123 and 124 are in the on state. Thus, the pixel electrode 131 being an anode of the OLED 130 is reset to the potential Gnd via the transistors 124 and 123, and the data line 14 and the transistor 612 in a sequential manner. Note that, because a capacitance is parasitic on the OLED 130, the pixel electrode 131 is reset in order to eliminate an influence of the voltage applied during the light emitting period performed directly before.

During the initialization period (A3) in the i-th row, the scanning signal /Gwr(i) is changed to the L level, the control signal /Gcmp(i) is changed to the H level, and the control signal /Gel(i) is changed to the H level. Thus, in the pixel circuit 110 in the i-th row, the transistor 122 is changed to be in the on state, the transistor 123 is changed to be in the off state, and the transistor 124 is changed to be in the off state.

Further, during the initialization period (A3), the control signal /Drst is maintained at the H level, the control signal Grst is changed to the L level, the control signal Gop is changed to the H level (the control signal /Gop is at the L level), and the control signal /Gini is maintained at the L level. Thus, during the initialization period (A3), the transistor 611 is maintained to be in the off state, the transistor 612 is changed to be in the off state, the transmission gate 613 is changed to be in the on state, and the transistor 614 is maintained to be in the on state.

Therefore, the data signal output line 14*c* is maintained at the potential Vini, and the potential Vini arrives at the gate node g of the transistor 121 via the transmission gate 613, the data line 14, and the transistor 122 in a sequential manner.

Note that, in the DA conversion circuit 41, during the initialization period (A3), the state in the initialization periods (A1) and (A2), in other words, the accumulation state of electrical charges according to the capacitance values of the capacitance elements C0 to C9 is maintained.

After the initialization period (A3), the compensation period (B) starts. During the compensation period (B) in the i-th row, the scanning signal /Gwr(i) is maintained at the L level, the control signal /Gcmp(i) is changed to the L level, and the control signal /Gel(i) is maintained at the H level. Thus, in the pixel circuit 110 in the i-th row, the transistor 122 is maintained to be in the on state, the transistor 123 is changed to be in the on state, and the transistor 124 is maintained to be in the off state.

During this compensation period (B), the transistor 121 is in a diode coupling state via the transistor 123, the data line 14, and the transistor 122 that are in the on state. Thus, the voltage between the gate node g and the source node s in the transistor 121 is converged to the threshold voltage of the transistor 121 (a close voltage). Note that the potential of the gate node g of the transistor 121 and the data line 14 in this state is regarded as a threshold equivalent potential.

Further, during the compensation period (B), the control signal /Drst is maintained at the H level, the control signal Grst is maintained at the L level, the control signal Gop is maintained at the H level (the control signal /Gop is at the L level), and the control signal /Gini is changed to the H level. Thus, during the initialization period (A3), the transistor 611 is maintained to be in the off state, the transistor 612 is maintained to be in the off state, the transmission gate 613 is maintained to be in the on state, and the transistor 614 is changed to be in the off state.

Therefore, at the terminal stage of the compensation period (B), the threshold equivalent potential at the data line 14 and the gate node g of the transistor 121 arrives at the other end of the capacitance element Cser and the other ends of the capacitance elements C5 to C9 via the transmission gate 613.

Note that, during the compensation period (B), the one ends of the capacitance elements C0 to C9 are maintained at the potential VL by the selection circuits 410 to 419, and the one end of the capacitance element Cser and the other ends of the capacitance elements C0 to C4 are maintained at the potential Vrst by the switch Rsw in the on state.

The potential Vrst is set to the average threshold equivalent potential in the transistor 121. Thus, at the terminal stage of the compensation period (B), the voltage applied to both the ends of the capacitance elements C0 to C4 and the voltage applied to both the ends of the capacitance elements C5 to C9 are substantially the same. Thus, during the compensation period (B), it can be regarded as electrical charges according to the capacitance values of the capacitance elements C0 to C9 are still accumulated.

After the compensation period (B), the writing period (C) starts. During the writing period (C) in the i-th row, the scanning signal /Gwr(i) is maintained at the L level, the control signal /Gcmp(i) is changed to the H level, and the control signal /Gel(i) is maintained at the H level. Thus, in the pixel circuit 110 in the i-th row, the transistor 122 is maintained to be in the on state, the transistor 123 is changed to be in the off state, and the transistor 124 is maintained to be in the off state.

Further, during the writing period (C), the control signal /Drst is maintained at the H level, the control signal Grst is maintained at the L level, the control signal Gop is maintained at the H level (the control signal /Gop is at the L level), and the control signal /Gini is maintained at the H level. Thus, during the initialization period (A3), the transistor 611 is maintained to be in the off state, the transistor 612 is maintained to be in the off state, the transmission gate 613 is maintained to be in the on state, and the transistor 614 is maintained to be in the off state.

However, in the DA conversion circuit 41 in each column, the control signal Rst is changed to the L level, and hence the switch Rsw is changed to be in the off state. Further, during the writing period (C), the bits D0 to D9 are values corresponding to the video data Vdata.

Of the selection circuits 410 to 414, the selection circuit with the supplied bit of "1" selects the potential VPL, and the selection circuit with the bit of "0" selects the potential VL. Further, of the selection circuits 415 to 419, the selection circuit with the bit of "1" selects the potential VPH, and the selection circuit with the bit of "0" selects the potential VL.

During the writing period (C), the voltage at the one end of the capacitance element corresponding to the bit of "0"

among the capacitance elements C0 to C9 is not changed from the voltage of the compensation period (B), which does not contribute to the voltage increase of the data line 14 via the data signal output line 14*c* and the transmission gate 613 in the on state.

Of the capacitance elements C5 to C9 corresponding to the five bits being more significant, one end of the capacitance element corresponding to the bit "1" is changed from the potential VL to the potential VPH during the writing period (C). Thus, the capacitance element with the bit of "1" among the capacitance elements C5 to C9 increases the potential of the data line 14 from the threshold equivalent potential in the compensation period (B) by an amount according to the weight of the capacitance value.

Of the capacitance elements C0 to C4 corresponding to the five bits being less significant, one end of the capacitance element corresponding the bit "1" is changed from the potential VL to the potential VPL during the writing period (C). However, unlike the other ends of the capacitance elements C5 to C9, the capacitance element Cser is interposed between the other ends of the capacitance elements C0 to C4 and the data line 14. Thus, a change amount from the potential VL to the potential VPL at the one end of the capacitance element corresponding to the bit of "1" among the capacitance elements C0 to C4 is compressed with the compression ratio k (1/32 in the example described above), and the voltage of the data line 14 is increased.

In this manner, during the writing period (C), for example, the DA conversion circuit 41 in the (3j−2)-th column increases the potential of the data line 14 in the (3j−2)-th column from the threshold equivalent potential by the voltage according to the video data Vdata in the i-th row and the (3j−2)-th column, in other words, the voltage for designating brightness of the OLED in the i-th row and the (3j−2)-th column.

During the writing period (C) in the i-th row, in the pixel circuit 110 in the i-th row, the transistor 122 is in the on state. Thus, the potential of the data line 14 arrives at the gate node g of the transistor 121, and is maintained by the capacitance element 140.

During the writing period (C) in the i-th row, in the pixel circuit 110 in the i-th row, the transistor 124 continues to be in the off state.

When the scanning signal /Gwr(i) is changed to the H level, the writing period (C) in the i-th row is terminated. When the scanning signal /Gwr(i) is at the H level, the transistor 122 is in the off state in the pixel circuit 110 in the i-th row. However, the voltage of the difference between the potential of the gate node g and the potential Vel is maintained by the capacitance element 140.

After the writing period (C), the light emitting period (D) starts. When the light emitting period (D) in the i-th row starts, the control signal /Gel(i) is inverted to the L level, and hence the transistor 124 is in the on state. Thus, the transistor 121 causes the current according to the voltage maintained by the capacitance element 140 to flow to the OLED 130. Thus, the OLED 130 is in an optical state according to the current, in other words, emits light at brightness.

Note that FIG. 11 illustrates an example in which the light emitting period (D) starts continuously after completing selection of the scanning line 12 in the i-th row. However, the period during which the control signal /Gel(i) is at the L level may be intermittent or may be adjusted according to brightness adjustment.

Further, the level of the control signal /Gel(i) in the light emitting period (D) may be increased from the L level in the compensation period (B). In other words, the level of the control signal /Gel(i) in the light emitting period (D) may be an intermediate level between the H level and the L level.

In FIG. 11, the horizontal scanning period (H) in the i-th row is described while focusing on the DA conversion circuit 41 corresponding to one column and the pixel circuit 110 that is in the i-th row and correspond to the column. However, the operation is similarly performed for the DA conversion circuits 41 and the pixel circuits 110 that correspond to the other columns.

Further, in FIG. 11, the operation of the horizontal scanning period (H) is described while focusing on the horizontal scanning period (H) in the i-th row. However, the operation is similarly performed sequentially for the horizontal scanning periods (H) in the first, second, third, . . . , 1,079-th, and 1,080-th rows.

In the pixel circuit 110, during the writing period (C) and the light emitting period (D), the potential of the gate node g in the transistor 121 is a potential that is changed from the threshold equivalent potential in the compensation period (B) according to the gradation level of the pixel circuit 110. The operation is similarly performed for the other pixel circuits 110. Thus, in the exemplary embodiment, in all the pixel circuits 110 in the 1,080 rows and the 5,785 columns, the current according to the gradation level flows to the OLEDs 130 in a state in which the threshold values of the transistors 121 are compensated. Therefore, in the present exemplary embodiment, fluctuation in brightness is reduced. As a result, display with high quality can be achieved.

Here, for the sake of convenience in description, a comparative example with respect to the exemplary embodiments is described. In the comparative example, briefly speaking, there is adopted a configuration in which the selection circuit 821 in the first layer in the inspection circuit 80 is replaced with a selection circuit similar to the selection circuit 822 in the second layer to the selection circuit 827 in the seventh layer.

In the comparative example, although not particularly illustrated, there is adopted a configuration that the selection signals Sel_1 to Sel_7 are instructed by the tester in the inspection operation. Meanwhile, in the display operation, the selection signals Sel_1 to Sel_7 are not instructed by the tester, and hence the selection signals Sel_1 to Sel_7 are not determined. Alternatively, the selection signals Sel_1 to Sel_7 are fixed at the low level or the H level. Alternatively, the selection signals Sel_1 to Sel_7 for selecting one specific column are supplied.

Figure 12:
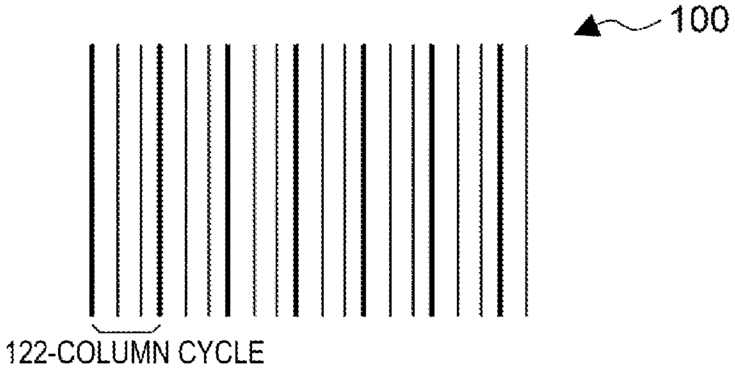
FIG. 12 is a diagram illustrating an example of a display screen of an electro-optical device according to a comparative example.

In the comparative example thus configured, in the display operation, for example, when the same video data Vdata (the bits D0 to D9 are the same) is commonly supplied to all the pixel circuits 110, in other words, so-called solid display is performed, display unevenness occurs in the Y direction with a cycle of the 122 columns, as illustrated in FIG. 12. The cause thereof is described later.

In the comparative example, the selection circuit in the first layer selects any one of the data lines 14, and the selection circuit 822 in the second layer selects any one of the two selection circuits in the first layer. Similarly to the above, the selection circuit 827 in the seventh layer selects any one of the two selection circuits 826 in the sixth layer. The data line 14 that is not selected by the selection circuit in the first layer is blocked at the input end of the selection circuit. In contrast, the data line 14 that is not selected by the selection circuit in the first layer is extended to the input end of the selection circuit 822 in the second layer.

Thus, the substantial path length of the selected data line 14 is longer than the path length of the non-selected data line 14. Note that the substantial path length of the data line 14 described herein includes not only the data line 14 itself but also the wiring line that is selected by the tournament circuit 82 and electrically coupled.

The data line 14 that is not selected by the selection circuit 822 in the second layer is blocked at the input end of the selection circuit 822. In contrast, the data line 14 that is selected by the selection circuit 822 in the second layer is extended to the input end of the selection circuit 823 in the third layer. Similar to the above, the data line 14 that is not selected by the selection circuit 827 in the seventh layer is blocked at the input end of the selection circuit 827. In contrast, the data line 14 selected by the selection circuit 827 in the seventh layer is extended to the input end of the amplifier 84.

In this manner, in the comparative example, in the display operation, the substantial path length of the data line 14 differs according to selection of the selection circuits in the seven layers. A capacitance is parasitic on the data line 14. Thus, when the path length differs, a capacitance parasitic on the data line 14 differs for each of the data lines 14. In particular, the DA conversion circuit 41 of the present exemplary embodiment has a configuration in which the electrical charges accumulated in the capacitance elements C0 to C9 during the reset period are left according to the bits D0 to D9 and are output to the data signal output lines 14*c* (the data lines 14) during the output period. In such a configuration, in a case in which capacitances parasitic on the data line 14 being output destinations are different from one another, even when the bits D0 to D9 are the same (have the gradation levels), the potential of the data line 14 during the output period differs for each of the data lines 14. This causes display unevenness as a result.

The 48 tournament circuits 82 have the same pattern of selecting the data lines 14 in the 122 columns. Thus, display unevenness occurs with a cycle of the 122 columns.

In contrast, in the present exemplary embodiment, in the display operation, the wiring line S1_*a* and the wiring line S1_*b* are always at the L level, and the wiring line /S1_*a* and the wiring line /S1_*b* are always at the H level. Thus, in the selection circuit 821 in the first layer, both the transmission gates Swa and Swb are in the off state. In the one tournament circuit 82, the data lines 14 in the 122 columns are blocked at the input ends of the selection circuits 821. In the other 47 tournament circuits 82, the data lines 14 are similarly blocked at the input ends of the selection circuits 821. Thus, in the present exemplary embodiment, in the display operation, the substantial path lengths of the data lines 14 in the 5,856 columns are aligned.

Therefore, according to the present exemplary embodiment, the capacitances parasitic on the data lines 14 in the 5,856 columns in the display operation are aligned. Thus, display unevenness as illustrated in FIG. 12 can be suppressed.

Depending on a type, a format, or the like of the tester, the number of voltages that are measured at the same time is limited in some cases. For example, unlike the first exemplary embodiment, the number of voltages that can be measured at the same time is the number less than "48", for example, "4" in some cases. In view of this, description is made on the second exemplary embodiment that enables measurement of the voltages output from the data lines 14 in the 5,856 columns even when the tester is capable of measuring only four voltages at the same time, for example.

Note that the electro-optical device 10 according to the second exemplary embodiment is different from the first exemplary embodiment only in the configuration of the inspection circuit 80, and the other elements are similar thereto. In view of this, in the second exemplary embodiment, the inspection circuit 80 is mainly described.

Figure 13:
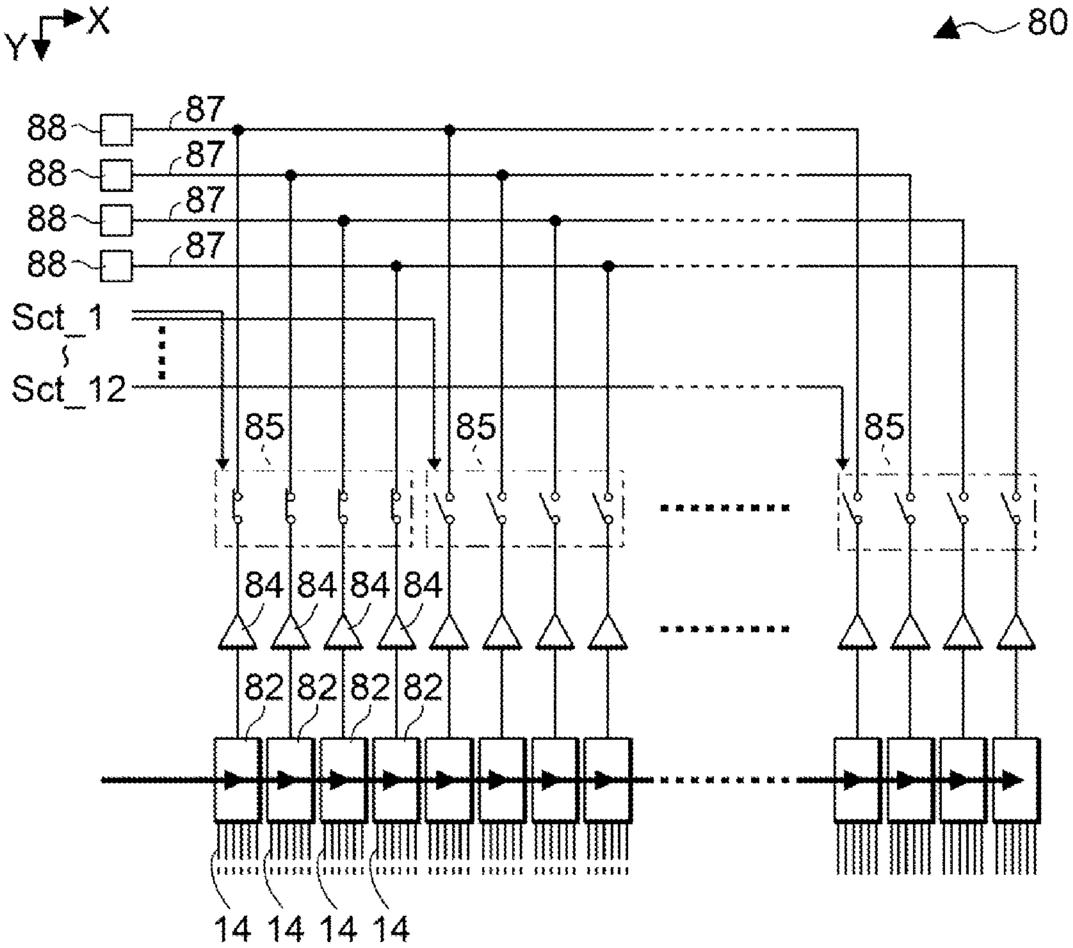
FIG. 13 is a diagram illustrating an inspection circuit of an electro-optical device according to a second exemplary embodiment.

FIG. 13 is a diagram illustrating the inspection circuit 80 of the electro-optical device 10 according to the second exemplary embodiment. In the inspection circuit 80 of the second exemplary embodiment, the tournament circuits 82 and the amplifiers 84 are grouped in sets of four sequentially from the left in the drawing. Thus, when the number of tournament circuits 82 is 48, which is the same as that in the first exemplary embodiment, the number of groups is "12". In the second exemplary embodiment, the four test output terminals 88 are provided, and each of the test output terminals 88 is electrically coupled to a wiring line 87.

In the second exemplary embodiment, switch circuits 85 are provided to the 12 groups respectively. From the left side, selection signals Sct_1 to Sct_12 are supplied to the 12 switch circuits 85 from, for example, the tester, respectively, and each of the switch circuits 85 includes four switches. The four switches included in each of the switch circuits 85 are simultaneously in the on state when the corresponding selection signal is at the H level, and are simultaneously in the off state when the corresponding selection signal is at the L level.

One end of each of the switches is coupled to an output end of the amplifier 84, and the other end of each of the switches is coupled to one wiring line 87 of the four wiring lines 87 which establishes the following relationship. In detail, when the one end of the switch is coupled to the first output end of the amplifier 84 from the left in the four tournament circuits 82 belonging to one group, the other end thereof is coupled to the first wiring line 87. When the one end of the switch is coupled to the output end of the second amplifier 84 from the left, the other end thereof is coupled to the second wiring line 87. Similarly, the one end of the switch is coupled to the output end of the third amplifier 84 from the left, the other end thereof is coupled to the third wiring line 87, and the one end of the switch is coupled to the output end of the fourth amplifier 84 from the left, the other end thereof is coupled to the fourth wiring line 87.

In the inspection operation, the tester selects one of the 12 groups, and sets only the selection signal designated for the selected group to be at the H level. For example, when the tester selects the first group from the left, only the selection signal Sct_1 of the selection signals Sct_1 to Sct_12 is set to be at the H level, and the other selection signals Sct_2 to Sct_12 are set to be at the L level.

During a period in which one group is selected, the tester selects the data line 14 in one column of the 122 columns by the selection signals Sel_1*a*, Sel_1*b*, and Sel_2 to Sel_7. The voltage of the selected data line 14 is amplified by the amplifier 84, and is output from the test output terminal 88. Thus, the tester checks whether the voltage output from the selected data line 14 falls within a predetermined range. Such checking is performed for each of the voltages output from the four test output terminals 88 while sequentially selecting the data lines 14 in the 122 columns. Further, the tester repeats such an operation while sequentially selecting one of the 12 groups at a time. With this, the tester checks whether the voltages output to the data lines 14 in the 5,856 columns fall within a predetermined range.

According to the second exemplary embodiment, even when the number of voltages that can be measured at the same time by the tester is "4" less than "48", the voltages output from the data lines 14 in the 5,856 columns can be measured.

Note that, similarly to the first exemplary embodiment, in the second exemplary embodiment, the capacitances parasitic on the data lines 14 in the 5,856 columns in the display operation are also aligned. Thus, display unevenness as illustrated in FIG. 12 can be suppressed.

In the first exemplary embodiment and the second exemplary embodiment described above (hereinafter referred to as "exemplary embodiments and the like"), various modifications or applications are possible as described below.

In the exemplary embodiments and the like, description is made with the OLED 130 illustrated as an example of the light emitting element. However, other light emitting elements may be used. For example, an LED may be used as the light emitting element, or a liquid crystal element in combination with an illumination mechanism. In other words, as the light emitting element, an electro-optical element in an optical state according to the voltage of the data line 14 may be adopted.

In the exemplary embodiments and the like, an example of conversion of the 10 bits is given as the DA conversion circuit 41. However, the exemplary embodiments and the like are not limited thereto.

In the exemplary embodiments and the like, there is adopted a configuration in which the threshold voltage of the transistor 121 in the pixel circuit 110 is compensated. However, a configuration without compensation of the threshold voltage, specifically, a configuration without the transistor 123 may be adopted.

The channel types of the transistors 121 to 124, 611, 612, and 614 are not limited to those in the exemplary embodiments and the like. Further, those transistors 121 to 124, 611, 612, and 614 may be replaced with a transmission gate as appropriate. In contrast, the transmission gates 613. Swa, Swb, Swc, and Swd may be replaced with a transistor of one channel type.

Next, an electronic apparatus to which the electro-optical device 10 according to the exemplary embodiments and the like is applied is described. The electro-optical device 10 is suitable for application with a small pixel and high definition display. Therefore, a head-mounted display is described as an example of the electronic apparatus.

Figure 14:
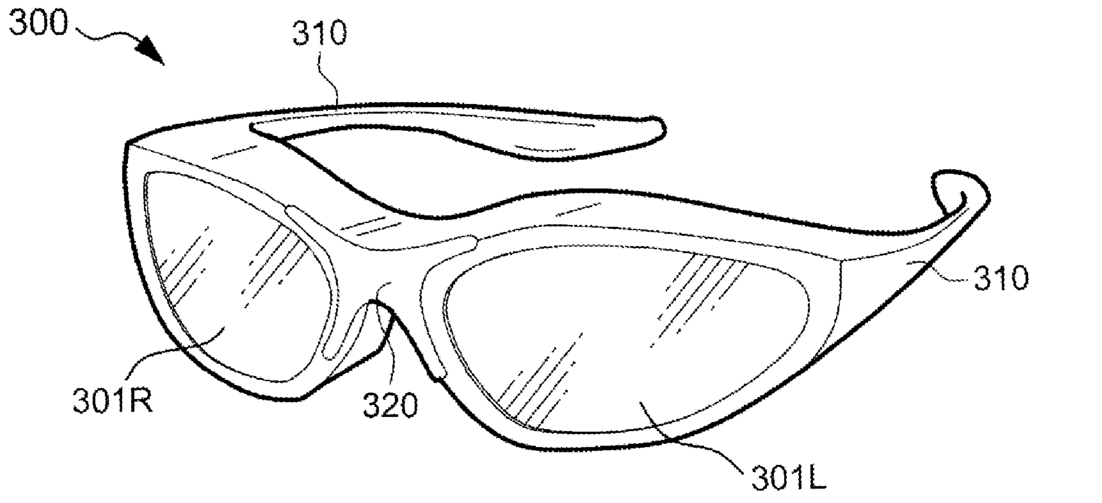
FIG. 14 is a perspective view illustrating a head-mounted display using an electro-optical device.
Figure 15:
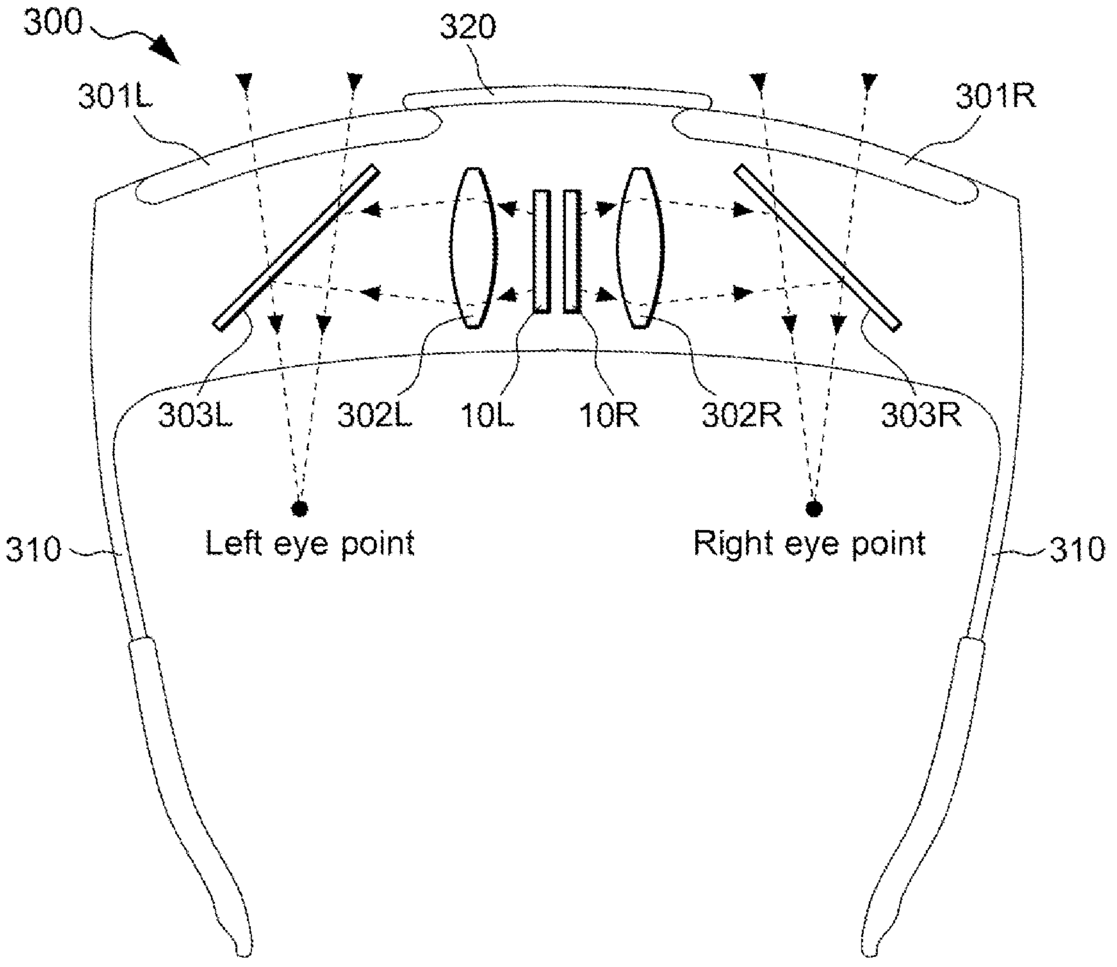
FIG. 15 is a diagram illustrating an optical configuration of the head-mounted display.

FIG. 14 is a diagram illustrating appearance of a head-mounted display, and FIG. 15 is a diagram illustrating an optical configuration thereof.

First, as illustrated in FIG. 14, a head-mounted display 300 includes, in terms of exterior, temples 310, a bridge 320, and lenses 301L and 301R, similar to typical eye glasses. In addition, as illustrated in FIG. 15, in the head-mounted display 300, an electro-optical device 10L for a left eye and an electro-optical device 10R for a right eye are provided in the vicinity of the bridge 320 and on the back side (the lower side in the drawing) of the lenses 301L and 301R.

An image display surface of the electro-optical device 10L is arranged to be on the left side in FIG. 15. Thus, a display image by the electro-optical device 10L is output via an optical lens 302L in a 9-o'clock direction in the drawing. A half mirror 303L reflects the display image by the electro-optical device 10L in a 6-o'clock direction, while the half mirror 303L transmits light incident in a 12-o'clock direction. An image display surface of the electro-optical device 10R is arranged on the right side opposite to the electro-optical device 10L. Thus, the display image by the electro-optical device 10R is output via the optical lens 302R in a 3-o'clock direction in the drawing. A half mirror 303R reflects the display image by the electro-optical device 10R in a 6-o'clock direction, while the half the mirror 303R transmits light incident in a 12-o'clock direction.

In this configuration, a wearer of the head-mounted display 300 can observe the display images by the electro-optical devices 10L and 10R in a see-through state in which the display images by the electro-optical devices 10L and 10R overlap the outside.

In addition, in the head-mounted display 300, in the images for both eyes with parallax, an image for a left eye is displayed on the electro-optical device 10L, and an image for a right eye is displayed on the electro-optical device 10R, and thus, it is possible to cause the wearer to sense the displayed images as an image displayed having a depth or a three-dimensional effect.

In addition to the head mounted display 300, the electric apparatus including the electro-optical device 10 can be applied to an electronic viewing finder in a video camera, a lens-exchangeable digital camera, or the like, a mobile information terminal, a wristwatch display, a light valve for a projection type projector, and the like.

For example, the following aspects of the present disclosure are understood from the exemplary embodiments illustrated above.

A drive circuit of an electro-optical device according to one aspect (a first aspect) includes a first conversion circuit being configured to convert first gradation data into an analog signal and supply the analog signal to a first data line, a second conversion circuit being configured to convert second gradation data into an analog signal and supply the analog signal to a second data line, a third conversion circuit being configured to convert third gradation data into an analog signal and supply the analog signal to a third data line, a fourth conversion circuit being configured to convert fourth gradation data into an analog signal and supply the analog signal to a fourth data line, a tournament circuit including a first selection circuit, a second selection circuit, and a third selection circuit, and a test output terminal, wherein, in a first operation, the first selection circuit selects any one of the first data line and the second data line, and electrically couples the one to one input end of the third selection circuit, the second selection circuit selects any one of the third data line and the fourth data line, and electrically couples the one to another input end of the third selection circuit, the third selection circuit selects any one of the one input end and the other input end, and determines the one as an output of the tournament circuit when a predetermined condition is satisfied, and the test output terminal outputs a voltage based on selection of the tournament circuit, and, in a second operation, the first selection circuit electrically decouples both the first data line and the second data line from the one input end of the third selection circuit, and the second selection circuit electrically decouples both the third data line and the fourth data line from the other input end of the third selection circuit.

According to the first aspect, display unevenness caused by a parasitic capacitance on the data line can be suppressed.

The inspection operation is an example of the first operation, and the display operation is an example of the second operation.

The data line 14 in the first column is an example of the first data line, the data line 14 in the second column is an example of the second data line, the data line 14 in the third column is an example of the third data line, and the data line 14 in the fourth column is an example of the fourth data line.

The DA conversion circuit 41 corresponding to the first column is an example of the first conversion circuit, the DA conversion circuit 41 corresponding to the second column is an example of the second conversion circuit, the DA conversion circuit 41 corresponding to the third column is an example of the third conversion circuit, and the DA conversion circuit 41 corresponding to the fourth column is an example of the fourth conversion circuit.

In the tournament circuit 82, in the first layer, the selection circuit 821 that inputs the data line 14 in the first column and the data line 14 in the second column is an example of the first selection circuit, and the selection circuit 821 that inputs the data line 14 in the third column and the data line 14 in the fourth column is an example of the second selection circuit. Further, in the second layer, the first selection circuit 822 from the left in FIG. 8 is an example of the third selection circuit.

Note that the predetermined condition is a condition that a selection result of the third selection circuit is a final output of the tournament circuit, specifically, a condition that the first selection circuit 822 in the second layer is selected by the first selection circuits 823 to 837 in the third to seventh layers.

In a drive circuit of an electro-optical device according to a second aspect being a specific aspect of the first aspect, the first selection circuit includes a first switching element being configured to be in an on state or an off state between the first data line and the one input end of the third selection circuit, based on a first selection signal, and a second switching element being configured to be in an on state or an off state between the second data line and the one input end of the third selection circuit, based on a second selection signal, and the second selection circuit includes a third switching element being configured to be in an on state or an off state between the third data line and the other input end of the third selection circuit, based on the first selection signal, and a fourth switching element being configured to be in an on state or an off state between the fourth data line and the other input end of the third selection circuit, based on the second selection signal.

In the first selection circuit 821, the transmission gate Swa is an example of the first switching element, and the transmission gate Swb is an example of the second switching element. In the second selection circuit 821, the transmission gate Swa is an example of the third switching element, and the transmission gate Swb is an example of the fourth switching element. The selection signal Sel_1*a* is an example of the first selection signal, and the selection signal Sel_1*b* is an example of the second selection signal.

A drive circuit of an electro-optical device according to a third aspect being a specific aspect of the second aspect includes an amplifier being configured to amplify a signal selected by the tournament circuit and supply the signal to the test output terminal. According to the third aspect, even when the output impedance of the data line 14 is high, the voltage of the data line 14 can be measured correctly.

In a drive circuit of an electro-optical device according to a fourth aspect being another specific aspect of the first aspect, p of the tournament circuits are included, where p is an integer equal to or greater than two, q of the test output terminals are included where q is an integer satisfying $q<p$, q signals are selected from signals based on the p tournament circuits, and switch circuits electrically coupled to the q test output terminals respectively are included. According to the fourth aspect, the signals selected by the plurality of tournament circuits can be measured by the small number of test output terminals.

A drive circuit of an electro-optical device according to a fifth aspect being a specific aspect of the fourth aspect includes q amplifiers being configured to amplify signals selected by the p tournament circuits and output the signals based on the p tournament circuits. According to the fifth aspect, even when the output impedance of the data line 14 is high, the voltage of the data line 14 can be measured correctly.

An electro-optical device according to a sixth aspect includes the drive circuit of the electro-optical device according to the first aspect that includes a scanning line drive circuit being configured to select a scanning line, a first pixel circuit that is provided corresponding to an intersection between the scanning line and the first data line and includes a light emitting element being configured to emit light according to a voltage of a first data line at the time of selecting the scanning line, a second pixel circuit that is provided corresponding to an intersection between the scanning line and the second data line includes a light emitting element being configured to emit light according to a voltage of a second data line at the time of selecting the scanning line, a third pixel circuit that is provided corresponding to an intersection between the scanning line and the third data line and includes a light emitting element being configured to emit light according to a voltage of a third data line at the time of selecting the scanning line, and a fourth pixel circuit that is provided corresponding to an intersection between the scanning line and the fourth data line and includes a light emitting element being configured to emit light according to a voltage of a fourth data line at the time of selecting the scanning line.

The pixel circuit 110 corresponds to an intersection between the scanning line in one row and the data line in the first column is an example of the first pixel circuit, the pixel circuit 110 corresponds to an intersection between the scanning line in one row and the data line in the second column is an example of the second pixel circuit, the pixel circuit 110 corresponds to an intersection between the scanning line in one row and the data line in the third column is an example of the third pixel circuit, and the pixel circuit 110 corresponds to an intersection between the scanning line in one row and the data line in the fourth column is an example of the fourth pixel circuit.

An electronic apparatus according to a seventh aspect includes the electro-optical device according to the sixth aspect.

What is claimed is:

1. A drive circuit of an electro-optical device, comprising:

a first conversion circuit being configured to convert first gradation data into an analog signal and supply the analog signal to a first data line;

a second conversion circuit being configured to convert second gradation data into an analog signal and supply the analog signal to a second data line;

a third conversion circuit being configured to convert third gradation data into an analog signal and supply the analog signal to a third data line;

a fourth conversion circuit being configured to convert fourth gradation data into an analog signal and supply the analog signal to a fourth data line;

a tournament circuit including a first selection circuit, a second selection circuit, and a third selection circuit; and a test output terminal, wherein in a first operation, the first selection circuit selects any one of the first data line and the second data line, and electrically couples the one to one input end of the third selection circuit, the second selection circuit selects any one of the third data line and the fourth data line, and electrically couples the one to another input end of the third selection circuit, the third selection circuit selects any one of the one input end and the other input end, and determines the one as an output of the tournament circuit when a predetermined condition is satisfied, and the test output terminal outputs a voltage based on selection of the tournament circuit, and in a second operation, the first selection circuit electrically decouples both the first data line and the second data line from the one input end of the third selection circuit, and the second selection circuit electrically decouples both the third data line and the fourth data line from the other input end of the third selection circuit.

2. The drive circuit of the electro-optical device according to claim 1, wherein the first selection circuit includes:

a first switching element being configured to be in an on state or an off state between the first data line and the one input end of the third selection circuit, based on a first selection signal; and a second switching element being configured to be in an on state or an off state between the second data line and the one input end of the third selection circuit, based on a second selection signal, and the second selection circuit includes:

a third switching element being configured to be in an on state or an off state between the third data line and the other input end of the third selection circuit, based on the first selection signal; and a fourth switching element being configured to be in an on state or an off state between the fourth data line and the other input end of the third selection circuit, based on the second selection signal.

3. The drive circuit of the electro-optical device according to claim 2, comprising:

an amplifier being configured to amplify a signal selected by the tournament circuit and supply the signal to the test output terminal.

4. The drive circuit of the electro-optical device according to claim 1, wherein p of the tournament circuits are included where p is an integer equal to or greater than two, q of the test output terminals are included where, q is an integer satisfying $q<p$, q signals are selected from signals based on the p tournament circuits, and switch circuits electrically coupled to q test output terminals respectively are included.

5. The drive circuit of the electro-optical device according to claim 4, comprising q amplifiers being configured to amplify signals selected by the p tournament circuits and output the signals based on the p tournament circuits.

6. An electro-optical device, comprising:

the drive circuit of the electro-optical device according to claim 1 that includes a scanning line drive circuit being configured to select a scanning line;

a first pixel circuit that is provided corresponding to an intersection between the scanning line and the first data line and includes a light emitting element being configured to emit light according to a voltage of a first data line at the time of selecting the scanning line;

a second pixel circuit that is provided corresponding to an intersection between the scanning line and the second data line and includes a light emitting element being configured to emit light according to a voltage of a second data line at the time of selecting the scanning line;

a third pixel circuit that is provided corresponding to an intersection between the scanning line and the third data line and includes a light emitting element being configured to emit light according to a voltage of a third data line at the time of selecting the scanning line; and a fourth pixel circuit that is provided corresponding to an intersection between the scanning line and the fourth data line and includes a light emitting element being configured to emit light according to a voltage of a fourth data line at the time of selecting the scanning line.

7. An electronic apparatus comprising the electro-optical device according to claim 6.

* * * * *